United States Patent [19]

Rosenberg et al.

[11] Patent Number: 6,134,506
[45] Date of Patent: Oct. 17, 2000

[54] METHOD AND APPARATUS FOR TRACKING THE POSITION AND ORIENTATION OF A STYLUS AND FOR DIGITIZING A 3-D OBJECT

[75] Inventors: Louis B. Rosenberg, Pleasanton; Bruce M. Schena, Menlo Park; Bernard G. Jackson, Atherton, all of Calif.

[73] Assignee: MicroScribe LLC, San Jose, Calif.

[21] Appl. No.: 08/739,454

[22] Filed: Oct. 29, 1996

Related U.S. Application Data

[62] Division of application No. 08/512,084, Aug. 7, 1995, Pat. No. 5,724,264.

[51] Int. Cl.[7] .................................................. G06F 3/033
[52] U.S. Cl. ............................ 702/95; 702/152; 700/195; 33/502; 33/503; 33/504
[58] Field of Search ............................ 364/571.01, 71.02, 364/571.04, 571.05, 571.08, 190, 559–564, 167.01, 474.03, 474.28, 474.35, 474.36, 474.37, 505, 506, 178, 551.02; 33/556, 558, 559, 561, 551, 502–505, 1 M, 1 N, 1 MP, 1 PT, 1 CC, 513, 514; 73/866.5, 862.041, 865.8, 1.37, 1.39, 1.41, 1.63, 1.73, 1.75, 1.78, 1.79, 1.81; 74/490.01, 490.05, 490.06, 490.07, 490.09; 901/41, 15, 3, 4, 27–29, 16; 395/82, 83, 86, 93, 90, 99; 345/161, 179, 162, 156–158; 178/18; 433/72, 75; 702/33, 87, 88, 94, 95, 97, 104, 105, 113, 116, 150–153, 155–158, 166–168

[56] References Cited

U.S. PATENT DOCUMENTS

| | | | |
|---|---|---|---|
| 2,906,179 | 9/1959 | Bower | 90/13.5 |
| 3,490,059 | 1/1970 | Paulsen et al. | 73/133 |
| 3,531,868 | 10/1970 | Stevenson | 33/174 |

(List continued on next page.)

FOREIGN PATENT DOCUMENTS

| | | | |
|---|---|---|---|
| 0470257A1 | 2/1992 | European Pat. Off. | B25J 13/00 |
| 0541500A1 | 5/1993 | European Pat. Off. | G05B 19/42 |
| 0634150A1 | 1/1995 | European Pat. Off. | A61C 13/00 |
| 0640902A2 | 3/1995 | European Pat. Off. | G05B 19/42 |
| 0655301A1 | 5/1995 | European Pat. Off. | B25J 19/00 |
| 434610 | 2/1992 | Japan . | |

(List continued on next page.)

OTHER PUBLICATIONS

Fisher, S.S. et al., "Virtual Environment Display System," ACM 1986, Workshop on Interactive 3D Graphics, Oct. 23–24, pp.

Meyer, Kenneth et al., "Survey of Position Tracker," The Massachusetts Institute of Technology, Spring 1992, vol. 1, No. 2, pp. 173–200. (No date with month).

"3D Human Interface Tool," 1994 Immersion Human Interface Corporation. (No date).

(List continued on next page.)

*Primary Examiner*—Hal Wachsman
*Attorney, Agent, or Firm*—James R. Riegel

[57] ABSTRACT

A method and apparatus for measuring three-dimensional (3-D) coordinates. A 3-D object can be digitized into a mesh representation manipulable by a computer system by tracing a stylus of a probe apparatus over surfaces of the object. The probe apparatus includes an arm having a series of linkages and joints. The arm can be assembled by placing the joints of the arm in joint fixtures a desired distance and angle apart and bonding the joints to a linkage. The probe apparatus is calibrated by placing the tip of the stylus at an arbitrary point in a work volume and varying the stylus' orientation to find error values and determine calibration parameters. The sensors of the probe apparatus are zeroed by placing the probe apparatus in the only possible home position and assigning assumed starting angles to the sensors. A rotary table can be used to support the object being digitized, where the rotation of the rotary table and object during digitization is sensed and included in coordinate calculations. A mesh representation of the object is-developed by a computer system by incrementally creating and displaying triangles from data points of contour lines of the mesh. A selection template allows commands to be selected by the stylus by defining a template having selection areas within the probe's work volume and associating the selection areas with specific commands to the host computer.

38 Claims, 18 Drawing Sheets

U.S. PATENT DOCUMENTS

| | | | |
|---|---|---|---|
| 4,477,973 | 10/1984 | Davies | 33/1 CC |
| 4,550,221 | 10/1985 | Mabusth | 178/18 |
| 4,550,617 | 11/1985 | Fraignier et al. | 73/862.04 |
| 4,571,834 | 2/1986 | Fraser et al. | 33/1 PT |
| 4,593,470 | 6/1986 | Davies | 33/1 CC |
| 4,601,206 | 7/1986 | Watson | 73/514 |
| 4,632,341 | 12/1986 | Repperger et al. | 244/230 |
| 4,638,798 | 1/1987 | Shelden et al. | 606/130 |
| 4,653,011 | 3/1987 | Iwano | 364/513 |
| 4,654,648 | 3/1987 | Herrington et al. | 340/710 |
| 4,676,002 | 6/1987 | Slocum | 33/1 MP |
| 4,679,331 | 7/1987 | Koontz | 33/551 |
| 4,688,983 | 8/1987 | Lindbom | 414/735 |
| 4,703,443 | 10/1987 | Moriyasu | 364/559 |
| 4,704,909 | 11/1987 | Grahn et al. | 73/862.04 |
| 4,750,487 | 6/1988 | Zanetti | 606/130 |
| 4,769,763 | 9/1988 | Trieb et al. | 364/559 |
| 4,787,051 | 11/1988 | Olson | 364/518 |
| 4,791,934 | 12/1988 | Brunnett | 128/653 |
| 4,798,919 | 1/1989 | Miessler et al. | 178/18 |
| 4,800,721 | 1/1989 | Cemenska et al. | 60/393 |
| 4,803,413 | 2/1989 | Kendig et al. | 318/648 |
| 4,807,152 | 2/1989 | Lane | 364/513 |
| 4,811,608 | 3/1989 | Hilton | 73/862.04 |
| 3,875,488 | 4/1975 | Crocker et al. | 318/648 |
| 3,890,958 | 6/1975 | Fister et al. | 128/714 |
| 3,944,798 | 3/1976 | Eaton | 3/56 |
| 4,148,014 | 4/1979 | Burson | 340/709 |
| 4,216,467 | 8/1980 | Colston | 340/365 L |
| 4,448,083 | 5/1984 | Hayashi | 73/862.04 |
| 4,815,006 | 3/1989 | Andersson et al. | 364/513 |
| 4,819,195 | 4/1989 | Bell et al. | 364/571.05 |
| 4,839,838 | 6/1989 | LaBiche et al. | 364/709.11 |
| 4,840,634 | 6/1989 | Muller et al. | 623/24 |
| 4,849,692 | 7/1989 | Blood | 324/208 |
| 4,879,556 | 11/1989 | Duimel | 341/20 |
| 4,888,877 | 12/1989 | Enderle et al. | 33/559 |
| 4,891,889 | 1/1990 | Tomelleri | 33/503 |
| 4,907,970 | 3/1990 | Meenen, Jr. | 434/45 |
| 4,907,973 | 3/1990 | Hon | 434/262 |
| 4,942,545 | 7/1990 | Sapia | 364/571.01 |
| 4,945,305 | 7/1990 | Blood | 324/207.17 |
| 4,945,501 | 7/1990 | Bell et al. | 364/571.05 |
| 4,961,138 | 10/1990 | Gorniak | 364/200 |
| 4,961,267 | 10/1990 | Herzog | 33/503 |
| 4,962,591 | 10/1990 | Zeller et al. | 33/502 |
| 4,982,504 | 1/1991 | Söderberg et al. | 33/502 |
| 4,983,786 | 1/1991 | Stevens et al. | 178/18 |
| 5,007,085 | 4/1991 | Greanias et al. | 380/25 |
| 5,007,300 | 4/1991 | Siva | 74/471 XY |
| 5,040,306 | 8/1991 | McMurtry et al. | 33/556 |
| 5,050,608 | 9/1991 | Watanabe et al. | 128/653 R |
| 5,072,361 | 12/1991 | Davis et al. | 364/167.01 |
| 5,088,046 | 2/1992 | McMurtry | 364/474.03 |
| 5,088,055 | 2/1992 | Oyama | 364/560 |
| 5,095,303 | 3/1992 | Clark et al. | 340/710 |
| 5,103,404 | 4/1992 | McIntosh | 318/568.223 |
| 5,116,051 | 5/1992 | Moncrief et al. | 273/448 B |
| 5,125,261 | 6/1992 | Powley | 33/502 |
| 5,126,948 | 6/1992 | Mitchell et al. | 364/474.03 |
| 5,128,671 | 7/1992 | Thomas, Jr. | 341/20 |
| 5,131,844 | 7/1992 | Marinaccio et al. | 433/72 |
| 5,132,672 | 7/1992 | Clark | 340/710 |
| 5,134,782 | 8/1992 | Breyer | 33/503 |
| 5,139,261 | 8/1992 | Openiano | 273/148 B |
| 5,142,506 | 8/1992 | Edwards | 367/127 |
| 5,142,931 | 9/1992 | Menahem | 74/471 XY |
| 5,143,505 | 9/1992 | Burdea et al. | 414/5 |
| 5,148,377 | 9/1992 | McDonald | 364/560 |
| 5,150,023 | 9/1992 | Toyama et al. | 318/567 |
| 5,168,453 | 12/1992 | Nomaru et al. | 364/468 |
| 5,178,012 | 1/1993 | Culp | 73/510 |
| 5,181,181 | 1/1993 | Glynn | 364/566 |
| 5,182,557 | 1/1993 | Lang | 341/20 |
| 5,184,306 | 2/1993 | Erdman et al. | 364/474.05 |
| 5,184,319 | 2/1993 | Kramer | 364/806 |
| 5,185,561 | 2/1993 | Good et al. | 318/432 |
| 5,187,874 | 2/1993 | Takahashi et al. | 33/502 |
| 5,189,806 | 3/1993 | McMurtry et al. | 33/503 |
| 5,204,824 | 4/1993 | Fujimaki | 364/474.03 |
| 5,208,763 | 5/1993 | Hong | 364/551.02 |
| 5,209,131 | 5/1993 | Baxter | 73/865.8 |
| 5,220,260 | 6/1993 | Schuler | 318/561 |
| 5,228,356 | 7/1993 | Chuang | 75/471 XY |
| 5,230,623 | 7/1993 | Guthrie et al. | 433/72 |
| 5,243,266 | 9/1993 | Kasagami et al. | 318/568.1 |
| 5,246,316 | 9/1993 | Smith | 408/1 |
| 5,251,127 | 10/1993 | Raab | 364/413.13 |
| 5,251,156 | 10/1993 | Heier et al. | 364/559 |
| 5,259,120 | 11/1993 | Chapman et al. | 33/502 |
| 5,259,894 | 11/1993 | Sampson | 156/64 |
| 5,262,777 | 11/1993 | Low et al. | 341/20 |
| 5,264,768 | 11/1993 | Gregory et al. | 318/561 |
| 5,275,565 | 1/1994 | Moncrief | 434/29 |
| 5,296,846 | 3/1994 | Ledley | 345/161 |
| 5,347,476 | 9/1994 | McBean, Sr. | 364/571.02 |
| 5,351,692 | 10/1994 | Dow et al. | 128/662.06 |
| 5,354,162 | 10/1994 | Burdea et al. | 414/5 |
| 5,379,663 | 1/1995 | Hara | 74/471 XY |
| 5,384,460 | 1/1995 | Tseng | 250/231.14 |
| 5,389,865 | 2/1995 | Jacobus et al. | 318/568.11 |
| 5,396,267 | 3/1995 | Bouton | 345/168 |
| 5,397,323 | 3/1995 | Taylor et al. | 606/130 |
| 5,402,582 | 4/1995 | Raab | 33/503 |
| 5,412,880 | 5/1995 | Raab | 33/503 |
| 5,414,337 | 5/1995 | Schuler | 318/561 |
| 5,417,696 | 5/1995 | Kashuba et al. | 606/9.1 |
| 5,428,748 | 6/1995 | Davidson et al. | 395/275 |
| 5,429,140 | 7/1995 | Burdea et al. | 128/774 |
| 5,429,682 | 7/1995 | Harlow, Jr. et al. | 118/681 |
| 5,436,542 | 7/1995 | Petelin et al. | 318/567 |
| 5,445,166 | 8/1995 | Taylor | 128/897 |
| 5,459,382 | 10/1995 | Jacobus et al. | 318/568.11 |
| 5,465,323 | 11/1995 | Mallet | 395/123 |
| 5,467,289 | 11/1995 | Abe et al. | 364/560 |
| 5,467,763 | 11/1995 | McMahon et al. | 600/201 |
| 5,510,977 | 4/1996 | Raab | 364/167.01 |
| 5,512,919 | 4/1996 | Araki | 345/156 |
| 5,513,100 | 4/1996 | Parker et al. | 364/167.01 |
| 5,526,576 | 6/1996 | Fuchs et al. | 33/503 |
| 5,576,727 | 11/1996 | Rosenberg et al. | 345/179 |
| 5,591,924 | 1/1997 | Hilton | 73/862.043 |
| 5,601,084 | 2/1997 | Sheehan | 128/661.04 |
| 5,623,582 | 4/1997 | Rosenberg | 395/99 |
| 5,625,576 | 4/1997 | Massie et al. | 364/578 |

FOREIGN PATENT DOCUMENTS

| | | |
|---|---|---|
| 2254911A | 10/1992 | United Kingdom . |
| WO9502801 | 1/1995 | WIPO . |
| WO9520787 | 8/1995 | WIPO . |
| WO9520788 | 8/1995 | WIPO . |
| WO9532459 | 11/1995 | WIPO . |

OTHER PUBLICATIONS

"The Personal Digitizer," 1994 Immersion Human Interface Corporation. (No date with month).

"Micro–Scribe–3D™ A New Dimension in Desktop Digitizing," Immersion Corporation. (No date).

Vortex–3D™ 3D Digitizing and Modeling Software, Immersion Corporation. (No date).

"High Performance Model of the Immersion Probe," Immersion Probe–MD™, Immersion Corporation. (No date).

Rosenberg, Louis B., Perceptual Design of A Virtual Rigid Surface Contact, Center for Design Research, Stanford University, Armstrong Laboratory, AL/CF–TR–1995–0029, Apr. 1993.

Jacobsen, S.C. et al., "High Performance, High Dexterity, Force Reflective Teleoperator II," ANS Topical Meeting on Robotics & Remote Systems, Albuquerque, New Mexico Feb. 24–27, 1991, pp. 1–10.

Kotoku, Tetsuo et al., "Environment Modeling for the Interactive Display (EMID) Used in Telerobotic Systems," IEEE Nov. 3–5, 1991, pp. 99–1004.

Bejczy, Antal K., "The Phantom Robot: Predictive Displays for Teleoperation with Time Delay," IEEE 1990, pp. 546–550. (No date with month).

Buttolo, Pietro et al., "Pen–Based Force Display for Precision Manipulation in Virtual Environments," IEEE Mar. 1995, pp. 1–8.

Tan, Hong Z. et al., "Human Factors for the Design of Force–Reflecting Haptic Interfaces," Tan, Srinivasan, Eberman, & Chang, ASME WAM 1994, pp. 1–11. (No date with month).

Ellis, R.E. et al., "Design and Evalusation of a High–Performance Prototype Planar Haptic Interface," ASME Dec. 3, 1993, DSC–vol. 49, pp. 55–64.

Adelstein Bernard D. et al., "A High Performance Two Degree–of–Freedom Kinesthetic Interface," Massachusetts Institute of Technology 1992, pp. 108–112. (No date with month).

Colgate J. Edward et al., Implementation of Stiff Virtual Walls in Force–Reflecting Interfaces, Sep. 22, 1993.

Iwata, Hiroo et al, Volume Haptization, IEEE 1993, pp. 16–18. (No date with month).

Fischer, Patrick et al., "Specification and Design of Input Devices for Teleoperation," 1990. (No date with month).

Burdea, Grigore et al., "Distributed Virtual Force Feedback," IEEE, May 2, 1993, pp. 25–44.

Rosenberg, Louis B., "The Use of Virtual Fixtures as Perceptual Overlays to Enhance Operator Performance in Remote Environments," Air Force Material Command, Sep. 1992, pp. 1–42.

Rosenberg, Louis B., "The Use of Virtual Fixtures to Enhance Operator Performance in Time Delayed Teleoperation", Crew Systems Directorate Biodynamics and Biocommunications Division Wright–Patterson, Air Force Material Command, Mar. 1993, pp. 1–45.

Burdea, Grigore et al., "A Portable Dextrous Master with Force Feedback," Presence: Teleoperators and Virtual Environments, MIT Press, Jun. 1991.

Rosenberg, Louis B. et al., "Perceptual Decomposition of Virtual Haptic Surfaces," IEEE, Oct. 1993.

Rosenberg, Louis B., "Virtual Fixtures as Tools to Enhance Operator Performance in Telepresence Environments," SPIE Telemanipulator Technology, 1993. (No date with month).

Rosenberg, Louis B., "Virtual Haptic Overlays Enhance Performance in Telepresence Tasks," SPIE 1994. (No date with month).

Burdea, Grigore et al., "Dextrous Telerobotics with Force Feedback–An Overview," Robotica 1991, vol. 9. (No date with month).

Yamakita, M. et al., Tele–Virtual Reality of Dynamic Mechanical Model, IEEE Jul. 7–10, 1992, pp. 1103–1110.

Adelstein, Bernard D. et al., "Design and Implementation of a Force Reflecting Manipulandum for Manual Control Research," 1992, pp. 1–24. (No date with month).

Ouh–young, Ming et al., "Force Display Performs Better than Visual Display in a Simple 6–D Docking Task," IEEE 1989, pp. 1462–1466. (No date with month).

Kim, Won S. et al., "Graphics Displays for Operator Aid in Telemanipulation," IEEE 1991, pp. 1059–1067. (No date with month).

Hannaford, Blake et al., "Performance Evaluation of a Six–Axis Generalized Force–Reflecting Teleoperator," IEEE Man/Jun. 1991, vol. 21, No. 3, pp. 620–633.

Kim, Won S. et al., "A Teleoperation Training Simulator with Visual and Kinesthetic Force Virtual Reality", Human Vision, Visual Proceedings, Proc. SPIE 1666, San Jose, CA, Feb. 1992.

Minsky, Margaret et al., "Feeling and Seeing: Issues in Force Display," ACM 1990, pp. 235–242. (No date with month).

Herndon, J.N. et al., "The State–of–the–Art Model M–2 Maintenance System," Proceedings of the 1984 National Topical Meeting on Robotics and Remote Handling in Hostile Environments, American Nuclear Society, pp. 59–65. (No date with month).

Batter, James J. et al., "Grope–1: A Computer Display to the Sense of Feel," pp. TA–4–188–TA–4–192. (No date with month).

Gotow, J.K., et al., "Perception of Mechanical Properties at the Man–Machine Interface," IEEE 1987, pp. 688–689. (No date with month).

"Foot–Operated Mouse," IBM Technical Disclosure Bulletin, Apr. 1986, vol. 28, No. 11.

Atkinston, William D. et al, "Computing with Feeling," Comput. & Graphics, vol. 2, No. 2–E, pp. 97–103. (No date).

Noll, A. Michael, "Man–Machine Tactile Communication Dissertation," Polytechnic Institute of Brooklyn, Jun. 1971, pp. 1–88.

Tavkhelidze, D.S., "Kinematic Analysis of Five–Ink Spherical Mechanisms," Mechanism and Machine Theory, 1974, vol. 9, pp. 181–190. (No date with month).

Ouh–young, Ming et al., "Using a Manipulator for Force Display in Molecular Docking," IEEE 1988, pp. 1824–1829. (No date with month).

"Cursor Waldo," Designer's Corner–Useful Technology for Your Idea File, Design News, Mar. 7, 1993, pp. 63.

METHOD AND APPARATUS FOR TRACKING THE POSITION AND ORIENTATION OF A STYLUS AND FOR DIGITIZING A 3-D OBJECT

This is a divisional of U.S. application Ser. No. 08/512,084 filed on Aug. 7, 1995 now U.S. Pat. No. 5,724,264.

BACKGROUND OF THE INVENTION

The present invention relates generally to input devices for interfacing with computer systems, and more particularly to computer input devices that provide spatial information about a three-dimensional object to computer systems which provide a representation of the object.

Three-dimensional (3-D) digitization is the process of sensing a three-dimensional object and creating a three-dimensional representation of the object which can be manipulated as digital data by a computer system. Detailed and accurate three-dimensional models can be created and manipulated by computer systems for use by animators, engineers, scientists, designers, architects, and others who have a need for a realistic three-dimensional, manipulable model derived from a real, physical object.

Many types of devices are available which can digitize three dimensional objects. A common type of digitizing apparatus utilizes a probe device, such as a stylus or other pointer, to trace over surfaces a three-dimensional object and thereby provide the spatial coordinate data of the object to a host computer system. The host computer system can sample the probe device to receive discrete data points at different spatial coordinates. The points can be joined together and displayed as a "mesh representation", which is a wire-frame type model comprising a set of vertices with interconnecting lines or polygons (typically called a "data set"). A realistic 3-dimensional shaded model can be created by a computer system from the mesh representation of an object.

A common type of probe apparatus utilizes mechanical linkages and sensors to determine the position of the stylus or other probe that is tracing the three-dimensional object. The stylus is fixed to one end of a series of mechanical linkages, and the other end of the linkage chain is connected to a base fixed to a stationary surface. Sensors can be included in joints of the linkage chain to sense the relative orientation of linkages, and therefore the stylus, are located with respect to the base. The angle data read by the sensors can be converted into coordinate data by a microprocessor interface or by the host computer system.

Problems with prior art 3-D digitizing methods often occur because the user is too constrained when tracing an object that is to be digitized. Typically, the user is required to trace the object along particular surfaces of the object and in particular directions on the surfaces. This can often cause errors in the resulting mesh representation when a surface is traced in the wrong direction or points are not connected properly. In addition, a user often cannot view a resulting mesh representation until the entire object or a large portion of the object has been traced by the digitizing apparatus. This allows further errors to be introduced into the mesh representation and causes more time to be spent correcting mesh representations, since the user cannot immediately determine if a point has been entered inaccurately.

Other inaccuracies are introduced when using prior art methods and apparatuses for digitizing 3-D objects. For example, a user may wish to move or rotate an object that has been only partially digitized to gain access to hard-to-reach surfaces on the object. The object can be placed on a rotary table, for example, to assist in easily rotating the object. However, once the object is moved, the host computer system can no longer develop a mesh representation from the old position of the object. In the prior art digitizers, a user must first select three or more points on the object, move the object to the desired new position, and re-select the same three or more points on the object at the new position. The host computer can transform the coordinates, taking into account the new position of the object, and thus continue developing the mesh representation. However, such a procedure typically introduces error into the mesh representation, since it is difficult to accurately re-select the same points at the object's new position. In addition, it is time consuming to perform such a procedure and unduly interrupts the digitizing process.

In many prior art digitizing apparatuses, the user is further constrained by the joints of the linkage assembly. Since wires are routed through the joints to carry electrical signals from sensors located therein, the joints typically include stops which limit the motion of a joint to under 360 degrees to prevent twisting and stressing the wires. However, this limited movement can inconvenience the user when tracing an object, especially when a limit to a joint is reached in a particular direction and further movement of the stylus in that direction is required to trace the surface of the object.

Further problems exist with the prior art digitizing apparatuses. Since the digitizing apparatuses must accurately sense an object to provide valid coordinate data to the computer system, calibration of the sensors of the apparatuses is of paramount importance to compensate for variations in the mechanical structure of the linkages and joints. In the prior art, calibration is typically accomplished by placing the stylus or other probe device at known locations in space and to record position readings at those known locations. Deviations between the known locations and the measured position readings can be used as error parameters to fine tune calibration parameters. However, such a calibration method requires that known locations be defined and that the stylus be accurately fixed to those known locations. This can require expensive precision fixtures. In addition, this calibration method is a slow and careful one, and can be tedious.

In addition, other initialization procedures of the prior art can be awkward or time consuming. Digitizing apparatuses often use less expensive relative sensors which detect a change in the position of a linkage of the digitizing apparatus rather than reading an absolute angle for the position of the linkage. When using such relative sensors, a "zeroing" procedure is often accomplished each time the apparatus is powered up to provide reference starting angles for the relative sensors. For example, in the prior art, zeroing can be accomplished by moving each individual joint to a stop of the joint and starting angles are "zeroed" at those points. However, in digitizing apparatuses having four, five or six degrees of freedom, this procedure can be very time consuming to move each individual joint each time the apparatus is powered up. Other digitizing apparatuses use a "home position" to provide starting angles. The stylus is placed into a receptacle on the base of the apparatus such that the reference starting angles for all the sensors is known when the apparatus is powered up. However, having the receptacle for a home position on the base of the apparatus typically requires a larger base that covers a larger surface area on a support surface such as a tabletop, which can be inconvenient. In addition, the more degrees of freedom on a digitizing apparatus, the more joints that need to be zeroed between the base and the probe. The greater the number joints to be zeroed, the greater the chance for error to be introduced in the zeroing process.

SUMMARY OF THE INVENTION

The present invention provides a measuring system for measuring three-dimensional (3-D) coordinates. In the preferred embodiment, the probe apparatus is used to digitize three-dimensional objects into a mesh representation manipulable by a computer system. Various improvements to a probe arm linkage, a calibration method and zeroing method for a probe apparatus, a rotary table for supporting an object to be digitized, a method for developing a mesh representation by a computer system, and a method for assembling a probe arm linkage are described herein.

A probe apparatus of the present invention for sensing the position and orientation of a probe, such as a stylus, includes a first joint member coupled to the probe that provides two degrees of freedom to the probe, and a first linkage rotatably coupled to the first joint member. Further, a second joint member is rigidly coupled to the first linkage and provides one degree of freedom to the probe. A second linkage is rigidly coupled to the second joint member, and a third joint member is rotatably coupled to the other end of the second linkage. The third joint member provides two degrees of freedom to the probe. Finally, a support base is coupled to the third joint member for supporting the probe apparatus. Transducers of the probe apparatus provide angular signals for the provided degrees of freedom to describe a position and orientation of the probe. Preferably, the probe apparatus provides 3-D data describing a 3-D object to the computer system. An electronics interface is included within a housing of said support base and provides the angular signals from the sensors to a computer system. The joint members can include a multistage stop joint of the present invention which provides over 360 degrees of rotational movement about an axis. To allow the first joint member to be small and the stylus to be easily manipulable by the user, the transducer for one of the first joint member degrees of freedom is positioned in the second joint member. The first joint member can provide three degrees of freedom to the probe in an alternate embodiment.

A method of the present invention for calibrating a probe apparatus for measuring 3-D coordinates, such as the probe apparatus described above, includes a step of sampling multiple orientations of the stylus as the orientation of the stylus is varied at an arbitrary point within the probe's work volume. The position of the stylus tip remains fixed while the user varies the orientation of the stylus. Multiple orientations are sampled from data provided by sensors on the probe apparatus. Spatial coordinates are then determined for the stylus at each of the sampled orientations of the stylus. Next, error values between the spatial coordinates of the sampled orientations are determined. Finally, the probe apparatus is optimized by determining calibration parameters based on the error values and using the calibration parameters when determining the position and orientation of the probe during normal operation. Preferably, previous calibration parameters are loaded from a memory device before the calibration process and are adjusted to become new calibration parameters. The adjusted parameters are preferably stored on an EPROM memory device which is unable to store data over previously written data stored in the EPROM. The adjusted calibration parameters are stored as a most recent set of calibration parameters in a specific section of the EPROM such that, when calibration parameters are retrieved during operation of the probe apparatus, only the most recent set of calibration parameters are retrieved. The calibration steps can be repeated when the stylus is placed at a different position in the selected volume and the sampled orientations from both of the positions can be used when determining the error values.

A method of the present invention for zeroing the sensors of a probe apparatus of a three-dimensional coordinate measuring system having relative sensors, such as the probe apparatus described above, includes placing the stylus (or other probe) in a receptacle positioned on one of the joints or one of the linkages of the probe apparatus. This receptacle preferably takes the form of a small bore or shallow divot. The linkage arm assembly can be in only one possible configuration while the stylus is positioned in the receptacle; this one configuration is known as a "home position." An indication is then received to zero the sensors of the probe apparatus, such as powering up the probe apparatus. Starting angles are then assigned to the sensors when the probe apparatus is in the home position. The starting angles provide a zero angle reference for the sensors of the probe apparatus. Preferably, the starting angles have previously been calibrated for the particular probe apparatus that is undergoing the zeroing process.

A rotary table of the present invention is for use with a 3-D digitizing system that includes a probe apparatus for measuring 3-D coordinates on an object resting on the rotary table, such as the probe apparatus described above. The rotary table includes a support base and a turntable which rotates. A sensor is coupled to the support base which measures an angular rotation of the turntable and provides the angular rotation to a host computer system. The host computer system includes the turntable rotation in a determination of the position and orientation of the probe when the probe is contacting the object resting on the turntable. The angular rotation is included in the probe determination when the probe has contacted the object before the turntable has been rotated and after the turntable has been rotated so that the object can be referenced at its new position. The sensor is preferably positioned near the center of said turntable such that a shaft of the sensor is coupled to the turntable. The turntable also preferably includes a receptacle positioned near a periphery (or the center) of the turntable for receiving the probe in an initialization procedure for locating the turntable relative to the probe apparatus. For example, the initialization procedure can include placing the probe in the receptacle, rotating the turntable while the probe is positioned in the receptacle, sampling multiple positions and orientations of the probe as the turntable is rotated, and determining the position and orientation of the rotary table relative to the probe apparatus using the sampled positions and orientations of the probe. Alternatively, the support base of the table is coupled to the base of the probe apparatus such that the position and orientation of the rotary table is fixed relative to the probe apparatus.

A method of the present invention for developing a mesh representation of a three-dimensional object by a computer system includes receiving a data point from a probe corresponding to a surface point on a surface of a three-dimensional (3-D) object. The data point is added to an end of a current contour line of the mesh representation, where the current contour line includes data points corresponding to surface points on the surface of the 3-D object. A triangle is then created in the mesh representation that includes a data point of the current contour line, a data point of a previous contour line, and a third data point from either the current contour line or the previous contour line. The previous contour line is adjacent to the current contour line and includes data points previously received from the probe. The triangle is created only when the current contour line is not the first and only contour line of the mesh representation. Preferably, data points of the triangle are chosen based on the distance between data points of the current contour line and data points of the previous contour line. In addition, a normal vector is assigned to the created triangle that indicates the exterior surface of the mesh representation. The orientation of the normal vector is based on orientation data included in the data points of the triangle. The triangle is displayed on a display screen of the host computer immediately after the triangle is created, thus displaying the mesh representation incrementally. When the received data point is the last data point of the current contour line, a triangle is created for each data point of the previous contour line that is not included in a triangle in a "close mesh" process. The data points are provided to the host computer from the probe as a user is tracing the probe across the surface of the object. The data points can be provided when a user control is activated or after the user traces the probe a minimum distance on the object.

A method of the present invention for providing a selection template that allows commands to be selected by a probe apparatus includes defining a template area as the selection template within a selected volume that the stylus of the probe apparatus can reach. A selection area is defined within the template area and is associated with a command to the host computer. The command associated with the selection area is provided to the host computer to select a function of said host computer or of the probe apparatus when the tip of the stylus is positioned within the selection area. Preferably, a plurality of selection areas are defined within the template area that are each associated with a different command. The selection areas can include indicia such as icons and labels. Some of the commands can manipulate the mesh representation of the object displayed by the host computer.

A method of the present invention is also described for assembling a linkage assembly including a plurality of joints and a linkage used in a probe apparatus for measuring three-dimensional coordinates, such as the probe described above. Two joint fixtures are positioned a desired distance apart and have a desired angle offset from each other. A joint of the linkage assembly is placed in each of the joint fixtures. The joints can be moved relative to the linkage connecting the joints so that the joints fit in the joint fixtures. The joints are then bonded to the linkage while the joints are placed in the joint fixtures. The linkage is preferably made of graphite, which is well adapted to the bonding process.

The features of the present invention allow for a more accurate, more convenient, and less expensive coordinate measuring and 3-D digitizing system than the systems of the prior art. Specifically, the probe arm apparatus provides a lightweight, accurate device for the user to handle. The calibration method allows a probe to be positioned at an arbitrary point in a volume and thus avoid expensive precision fixtures. The zeroing method is more accurate and allows only one possible physical configuration of the probe arm to be in the home position. The method of the present invention for assembling linkages and joints for a probe apparatus allows accurate lengths and angles between joints. The rotary table allows an object to be re-oriented by a user during digitization without a cumbersome procedure and with great accuracy. The method for developing a mesh representation allows a user to incrementally view a mesh representation and quickly and accurately finds the orientation of the mesh polygons. Finally, the selection template allows the user to conveniently select commands and functions of the host computer and probe during a digitization process.

These and other advantages of the present invention will become apparent to those skilled in the art upon a reading of the following specification of the invention and a study of the several figures of the drawing.

BRIEF DESCRIPTION OF THE DRAWINGS

FIG. 3b is a flow diagram illustrating an alternate zeroing process to the process of FIG. 3a;

DETAILED DESCRIPTION OF PREFERRED EMBODIMENTS

Figure 1:
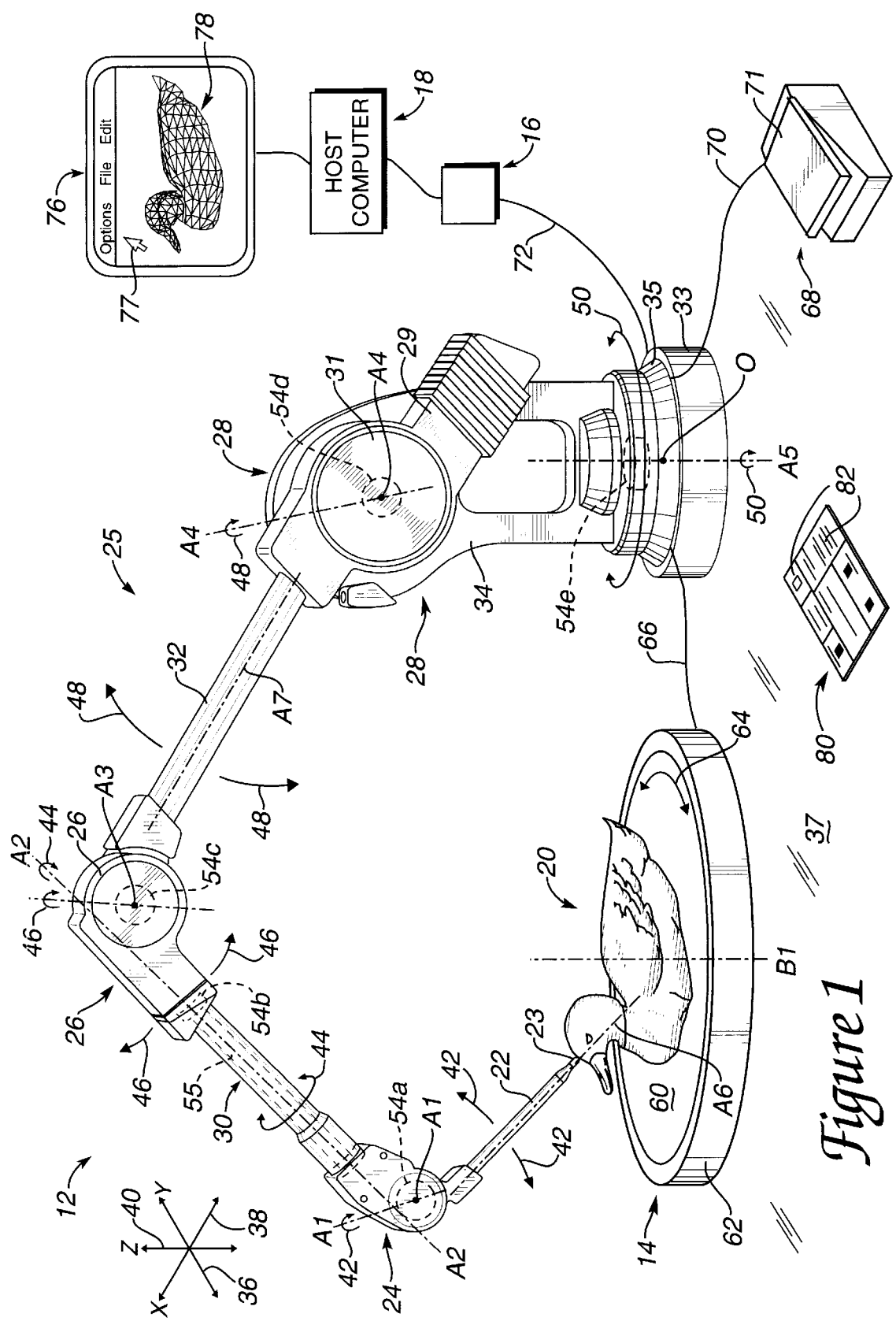
FIG. 1 is a perspective view of a measuring and digitizing system in accordance with the present invention.

In FIG. 1, a digitizing system 10 for measuring a three-dimensional (3-D) object and providing a representation of the three-dimensional object in a computer system includes a probe apparatus 12, a rotary table 14, an electronic interface 16, and a host computer 18. A three-dimensional object 20 is shown resting on rotary table 14. The illustrated digitizing system 10 is directed to providing a highly accurate representation of object 20 which host computer 18 can display, edit, copy, provide to other computer systems, or otherwise manipulate.

Probe apparatus 12 is provided to allow a user to measure and transmit location information of object 20 to host computer 18. As is well-known to those skilled in the art, a probe that is traced over a 3-D object, such as object 20, can provide coordinate information describing the 3-D geometry of object 20. In the preferred probe apparatus, this coordinate information is provided using sensors operative to measure positions of the probe apparatus as it is moved to various locations with respect to the fixed base. This is described in greater detail below.

Probe apparatus 12 preferably includes a stylus probe 22 and a mechanical linkage assembly 25. Stylus 22 is a pen-like rod that can be manipulated between a user's fingers to allow a fine degree of control of the probe apparatus. Stylus 22 includes a tip 23 that is used to reference the location of a point pointed to by the probe apparatus. Probes other than stylus 22 can be used in other embodiments. For example, a curved or angled member, hand grip, palm-supported stylus, or other type of probe can be used.

Stylus 22 is coupled to mechanical linkage assembly 25. Linkage assembly 25 (or "arm") preferably includes joint members 24, 26, and 28, linkages 30, 32 and 34, and base 33. Base 33 also preferably includes a base joint 35 coupled between the base and linkage 34. Stylus 22 is coupled to linkage 30 via joint member 24, and linkage 30 is coupled to linkage 32 via joint member 26. Linkage 32 is coupled to base 33 via joint member 28. The term "joint member", as used herein, refers to a connection mechanism between individual linkage components that may includes at least one "joint" which provides a degree of freedom. Base 33 is preferably securely placed upon or fixed to a support surface 37, such as a tabletop.

Each joint member 24, 26, 28, and 35 provides one or more degrees of freedom to stylus 22 within three-dimensional coordinate space defined by x-axis 36, y-axis 38, and z-axis 40 with respect to fixed base 33. For example, joint member 24 includes two joints which allow stylus 22 to move about axis A1, as shown by arrows 42 and about axis A2, as shown by arrows 44. Preferably, joint member 24 and stylus 22 can be rotated about axis A2 while linkage 30 remains fixed in joint member 26. Joint member 26 includes one joint that allows stylus 22, joint member 24, and linkage 30 to move about axis A3, as shown by arrows 46. Joint member 28 includes two joints that allow stylus 22, joint members 24 and 26, and linkages 30 and 32 to move about axis A4, as shown by arrows 48, and about axis A5, as shown by arrows 50. Joint member 28 actually includes member 31, which rotates about axis A4, and member 34, which is separated from base 33 by joint 35 and rotates to allow linkage assembly 23 to rotate with reference to base 33. Joint 35 allows joint members 24, 26, and 28, linkages 30 and 32, and stylus 22 to move about axis A5. The stylus 22 of the preferred probe apparatus 12 thus can be moved in five degrees of freedom about the axis A1–A5.

In alternate embodiments, additional degrees of freedom can be added. For example, stylus 22 can be rotated about an axis A6 that is parallel to the lengthwise direction of the stylus to provide a sixth degree of freedom. Conversely, less degrees of freedom can be provided to stylus 22 in some embodiments where more than three or four degrees of freedom are not necessary.

The linkage assembly of the present invention has unique features. Joint member 28 includes two joints and provides two degrees of freedom about axes A4 and A5. Joint member 26 is isolated from the other joint members by linkages 30 and 32 and provides only one degree of freedom about axis A3. Joint member 24 includes two joints that each provide stylus 22 a degree of freedom about axis A1 and A2, respectively. Thus, linkage assembly has a 2 joint, linkage, 1 joint, linkage, 2 joint configuration. This configuration has the advantage that linkages 30 and 32 need not rotate about a longitudinal axis through the center of each of the linkages, i.e., linkage 30 does not rotate about axis A2 and linkage 32 does not rotate about an axis A7 extending longitudinally through the center of linkage 32. Linkages 30 and 32 are thus rigidly coupled to and fixed to joint member 26 and joint member 28, respectively. Since linkages 30 and 32 do not have to rotate as described, any eccentricities (bends, warps, twists, etc.) in the linkages 30 and 32 therefore do not introduce error into the sensing of stylus 22 when stylus 22 is moved.

In addition, member 31 of joint member 28 preferably includes a weighted end 29. A heavy material, such as lead or another metal, is included within end 29 to counterbalance linkage assembly 23. When end 29 is properly weighted, joint member 26 (the "elbow" of the arm) does not get "lock" as easily in a fully extended position as when end 29 is not weighted, i.e., the weight counterbalances the linkage assembly so that it is easier to move joint 26 from the extended position. The extended position occurs when linkages 30 and 32 are approximately arranged in a straight line. Weighted end 29 also allows stylus 22 to be moved more easily in the working volume.

Preferably, sensors 54 (or similar types of transducers) are included in joint members 24, 26, 28, and 35 to measure the change in angle between linkages after power up of probe apparatus 35 12. Herein, the term "position" refers to the linear coordinate position of tip 23 of stylus 22 along x-axis 36, y-axis 38, and z-axis 40 with respect to an origin O at base 33. For example, each point in space has a unique position having x, y, and z coordinates. The term "orientation", as used herein, refers to the roll, pitch, and yaw of stylus 22 at a particular position with respect to the origin at base 33. For example, the tip 23 of stylus 22 may be at a position (x, y, z) while the stylus 22 has a particular orientation including an angle defined by yaw and pitch coordinates and a spin defined by a roll coordinate. Each of the transducers therefore preferably provides angular position signals or "annular signals" for one of the degrees of freedom of the apparatus.

Sensor 54a is preferably included in joint member 24, two sensors 54b and 54c are included in joint member 26, one sensor 54d is included in joint member 28, and one sensor 54e is included in base 33 (or member 34). Sensor 54b is preferably coupled to joint member 24 via a shaft 55 which is directed through the interior of linkage 30. Thus, when joint member 24 is rotated about axis A2, shaft 55 also rotates, and this rotation is detected by sensor 54b. The position of sensor 54b in joint member 26 allows joint member 24 to be as small as possible, which allows stylus 22 to be manipulated more conveniently by the user. An additional sensor can be included in joint member 24 to measure movement of stylus 22 about axis A6 in other embodiments. Alternatively, to keep joint member 24 as small as possible, this additional sensor can be positioned in joint member 26 and coupled to stylus 22 with cables or shafts similar to shaft 55. The sensors can be placed in other locations of linkage assembly 23 in other embodiments. Sensors 54 are preferably relative optical encoders for measuring the angle change of rotation of a sensor shaft aligned with a particular axis A1–A5, as is well known to those skilled in the art. A suitable sensor 54, for example, is an optical encoder manufactured by Hewlett Packard. Alternatively, other types of sensors can be used, such as absolute encoders, potentiometers, magnetic sensors, etc., as well as sensors that detect linear motion rather than angular rotation.

A user can "trace" the contours, edges, and surfaces of object 20 with stylus 22 to relay position and orientation information of the stylus to host computer 18, i.e. the user can "digitize" object 20. Herein, "tracing" refers to contacting tip 23 of stylus 22 on a surface of object 20 and moving the stylus along the surface. Sensors 54 of the probe apparatus relay relative angular orientations of linkage assembly 25 and stylus 22 as the stylus is moved to host computer 18, which converts the angle information into coordinates and into a mesh representation (a type of geometric representation) of the surface that was traced. Methods of tracing an object with a stylus for such a purpose are well-known to those skilled in the art, and are described in greater detail with reference to FIG. 9.

Probe apparatus 12 can be used for a variety of different applications other than digitizing 3-D objects. For example, Virtually any apparatus that spatially measures an object and transmits coordinate information to a host computer can be used with rotary table 14.

Rotary table 14 is supported by support surface 37 within the work volume of probe apparatus 12, where the "work volume" is defined herein as the entire volume surrounding probe apparatus 12 which can be reached by tip 23 of stylus 22. Other types of 3-D measuring apparatuses have work volumes defined by the reachable volume of a probe element that contacts the object. The rotary table of the present invention is preferably placed such that the entire table 14 is included in the work volume. In addition, other embodiments of the rotary table 14 may be attached to base 33 of probe apparatus 12, as discussed in greater detail with respect to FIG. 6.

Rotary table 14 includes a turntable 60 and a table base 62. Turntable 60 can be rotated about axis B1 as indicated by arrow 64 while table base 62 remains fixed in place. Object 20 rests on a surface of turntable 60, and is preferably coupled to the surface by cords, glue, screws, or other fasteners to prevent the object from moving relative to the rotating surface 60. In addition, rotary table 14 outputs signals on bus 66 to an interface 16 or host computer 18 indicating any change in location of object 20 about axis B1. This is described in greater detail with reference to FIG. 6. Rotary table 14 allows a user to move object 20 so as to angle the object more favorably for tracing with stylus 22. For example, if object 20 presents some surfaces that are difficult to contact with tip 23 of stylus 22, the object can be moved by rotating surface 60 about axis B1 until the desired surface of the object is more accessible to stylus 22. Moving the object 20 on the rotary table of the present invention does not cause errors in further coordinate measurements of the object 20.

It should be noted that rotary table 14 can be used with a wide variety of three-dimensional digitizing apparatuses. Virtually any apparatus that spatially measures an object and transmits measured information to a host computer can be used with rotary table 14.

Foot pedal 68 is preferably coupled to probe apparatus 12 by a bus 70. Foot pedal 68 includes a activation pedal 71 or similar control, such as a button, switch, etc. The foot pedal 68 is preferably placed below or to the side of support surface 37 to allow a user of probe apparatus 14 to access the pedal easily. When foot pedal 68 is activated by a user, the relative angles read by sensors 54 from a reference position are read by host computer 18, and the host computer calculates the current position and orientation of stylus 22 and tip 23 using the angle information. The position and orientation is expressed as a coordinate "point", i.e. a set of x, y, z, roll, pitch, yaw coordinates. Foot pedal is conveniently placed so that a user can use his or her foot to activate the pedal. The user thus does not have to remove or shift his or her hands from stylus 22 or probe apparatus 12 when sending coordinate information to host computer 18. Alternatively, foot pedal 68 can be provided as a button or switch located on stylus 22, on a different location of linkage assembly 25, on rotary table 14, or as a separate hand control. Also, foot pedal 68 can be coupled to probe apparatus 12 and be separately coupled to host computer 18 or interface 16, or could be connected to the host computer via rotary table 14. A method of digitizing object 20 using foot pedal 68 is described in greater detail with respect to FIG. 11.

Electronics interface 16 is coupled to probe apparatus 12 by a bus 72. In the preferred embodiment, interface 16 is included within the outer casing of base 33 (or member 34) of the probe apparatus. Alternatively, interface 16 can be provided external both to probe apparatus 12 and host computer 18, or the interface can be provided within host computer 18. In the preferred embodiment, interface 16 serves as an input/output (I/O) device to receive angles from sensors 54 of probe apparatus 12 and transmit those angles to host computer 18, as well as to transmit commands from host computer 18 to probe apparatus 12. Alternatively, interface 16 can transmit coordinate data that was calculated from the raw angle data to host computer 18. The interface 16 can also receive commands from foot pedal 68, rotary table 14, or other buttons and/or controls of probe apparatus 12. Interface 16 is described in greater detail with reference to FIG. 1a.

Host computer 18 receives coordinate data from probe apparatus 12 describing object 20. Computer 18 uses the coordinate data to develop a representation of the object 20. For example, in the described embodiment, the computer can form and display a highly accurate pictorial representation of object 20, called a "mesh" representation, which includes precise measurements, angles, and other spatial information. Host computer preferably includes standard components such as a microprocessor, random access memory (RAM), read-only memory (ROM), input/output electronics, and storage devices such as a hard disk drive, CD ROM drive, etc. Preferably, host computer 18 is a personal computer or workstation, such as an IBM-PC AT or Macintosh personal computer, or a SUN or Silicon Graphics workstation. Most commonly, the host computer system is a personal computer which operates under the MS-DOS or Windows operating systems in conformance with an IBM PC AT standard.

The host computer 18 is preferably coupled to a display screen 76 which can be used to display a mesh representation 78 of object 20 to the user. The mesh representation is shown in greater detail with respect to FIG. 10. In the preferred method of the present invention, mesh representation 78 can be displayed as the user is tracing over object 20 so that the user can incrementally view how the object is being represented within computer system 18. This helps a user to spot tracing mistakes as soon as the mistakes are made, rather than having to wait for the entire object to be traced and then viewing a resulting mesh representation. This preferred method is described in greater detail with respect to FIG. 11.

Display screen 76 also preferably displays a user interface to an operating system implemented by host computer 18. Software can be implemented on host computer 18 such that commands are displayed to the user on display screen 76 to offer various options when tracing an object, entering coordinates, displaying the mesh representation, or a shaded model derived from the mesh representation, etc., as is well known to those skilled in the art.

A cursor or pointer 77 displayed by the operating system or application program running on computer system 18 is preferably displayed to access functions to manipulate the displayed mesh representation or to access features of probe apparatus 12 and rotary table 14. The pointer can traditionally be manipulated by an input pointing device such as a mouse, trackball, touch pad, or the like. In the present invention, stylus 22 of probe apparatus 12 can also preferably be used to control pointer 77. As the stylus is moved through 3-D space, the host computer can receive the position data for stylus 22 and convert the data into 2-dimensional coordinates. The host computer 18 would then move pointer 77 to those 2-dimensional coordinates, as is well known to those skilled in the art. The conversion of 3-D coordinates to 2-D coordinates can be accomplished by simply ignoring a third coordinate, such as the z-coordinate; or, all three coordinates can be converted into 2-D coordinates by projecting data into a given plane. Foot pedal 71 can be used similarly to a mouse or other pointing device button. The control of pointer 77 by stylus 22 can be implemented as a mode, where the user can select whether to be in computer cursor control mode or in 3-D trace mesh mode. These modes can be selected or toggled by software running on host computer 18 through command in an operating system or by using selection template 80 (described below).

Selection template 80 presents a collection of selection areas 82 within template 80 describing options, commands, and other functions which relate to probe apparatus 12 and host computer 18. These functions are preferably implemented using software running on host computer 18; however, the functions can be implemented on a controller microprocessor in probe apparatus 12 or a different connected controller or computer system for digitizing system 10. Template 80 preferably has a thin, planar shape with a flat surface and is made out of a material such as card stock, plastic, or other durable material. Alternatively, template 80 can be a rectilinear, cubic, or other three-dimensional shape having a flat surface to display selection areas 80. Selection areas 80 can include indicia such as word commands, e.g., "start new mesh", as well as icons, shapes, and other pictures. When a user moves tip 43 of stylus 22 onto or over a selection area of template 80, a function of probe apparatus 12 or control software running on host computer 18 is implemented. For example, if the user moves the stylus 22 onto a square icon labeled "Save Mesh", then the three-dimensional mesh currently displayed on display screen 76 is saved to a storage device coupled to host computer 18, such as a hard disk. As described below with reference to FIG. 8, other commands can be selected to erase a mesh, start a new mesh, load a mesh from a storage device, copy a mesh, select modes of probe apparatus 12 such as "auto-trigger" mode (described below), etc.

A separate sensing device, such as the conventional type of contact-sensitive tablet used for detecting a stylus, is not coupled to template 80 to determine the functions or commands pointed to by stylus 22. This is because the position and orientation of tip 43 of stylus 22 with respect to the base 33 is already known to host computer 18 through the sensors 54 of probe apparatus 12. The area defined by template 80 in the work volume of probe apparatus 12 is preferably initialized in a setup procedure for probe apparatus 12 which determines the position and orientation of the template with respect to the fixed base (described with reference to FIGS. 6 and 8). The template and the locations of selection areas 82 are defined in the setup procedure, so that when tip 43 of stylus 22 is pointing to those defined selection areas, host computer 18 implements a predefined function for that selection area. This provides a very convenient method for the user to select commands while tracing object 20, since the user does not have to manipulate a separate input device, such as a mouse or trackball device, and does not have to view and move a cursor video screen. The user can simply touch the stylus 22 onto the desired command. Template 80 is shown attached to the support surface 37 in FIG. 1. Template 80 can also be attached, for example, to base 33 or linkage 34 of probe apparatus 12, rotary table 14, or a different convenient surface within the work volume of probe apparatus 12 with a known location with respect to base 33.

Figure 1A:
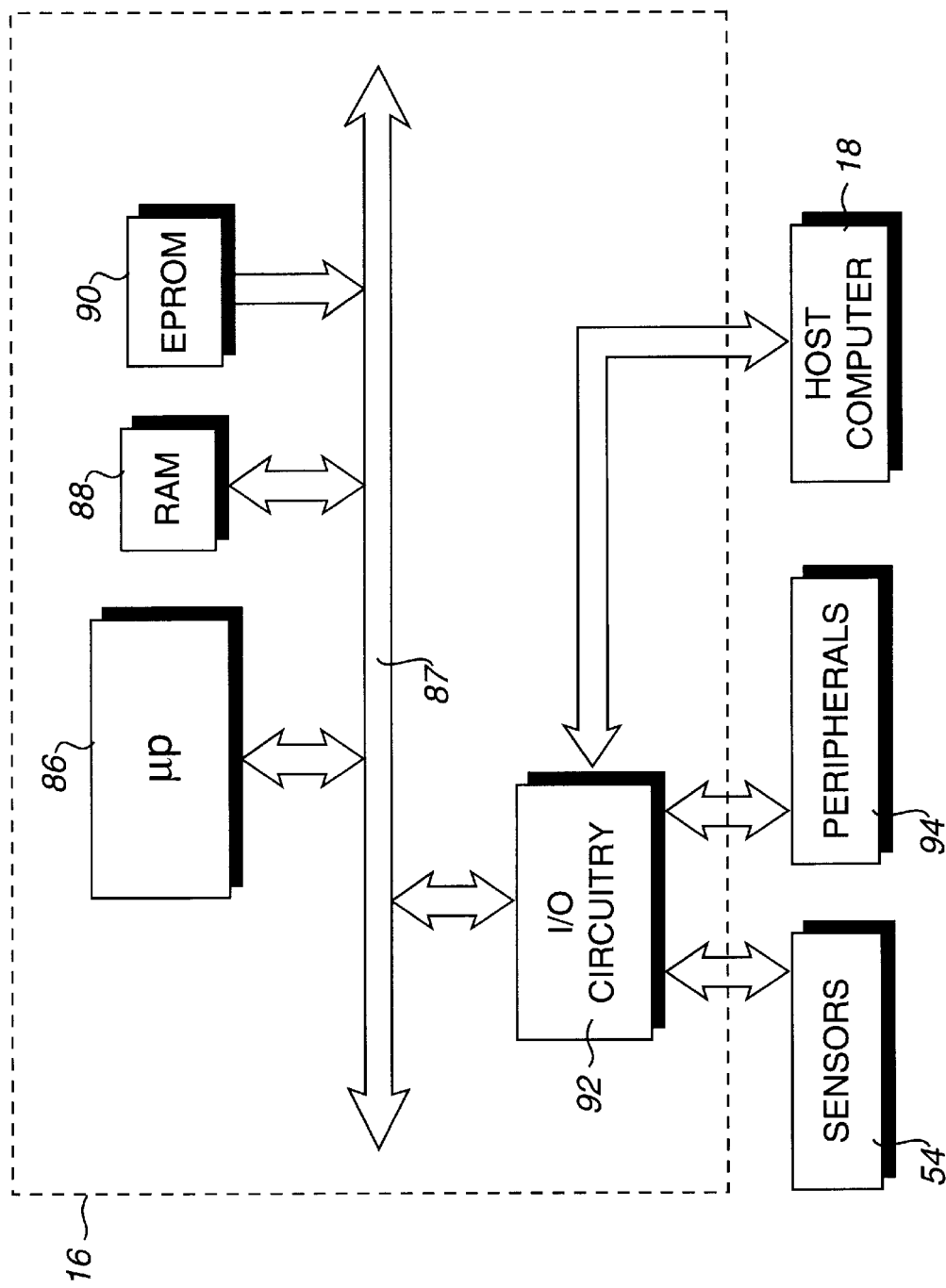
FIG. 1a is a block diagram of interface electronics for use with the digitizing system of FIG. 1.

FIG. 1a is a block diagram illustrating a preferred electronics interface 16 for the digitizing system 10 shown in FIG. 1. Interface 16 preferably includes a microprocessor 86, random access memory (RAM) 88, read-only memory (ROM) 90, and input/output (I/O) circuitry 92. Microprocessor 86 receives digital signals from the sensors 54 of the probe apparatus and provides angle data to host computer 18, and also may receive commands from host computer 18. Alternately, microprocessor 86 can also compute coordinate data from the angle data. RAM 88 can provide storage for bookkeeping and temporary data. ROM 90 stores instructions for microprocessor 86 to follow and can be an erasable programmable read only memory (EPROM), for example. ROM 90 also preferably stores calibration parameters and other parameters as described subsequently. Microprocessor 86, RAM 88, and ROM 90 can be coupled together by an address/data/control bus 87. Preferably, these components are all integrated in a microcontroller chip, such as Motorola 68HC11, the use of which is well known to those skilled in the art.

I/O circuitry is coupled to bus 87 and can include a variety of circuits and processors for use with probe apparatus 12. Sensors 54, peripherals 94, and host computer 18 are coupled to I/O circuitry 92. I/O circuitry can include pre-processors for converting digital sensor information to angular changes and sending the angle information to microprocessor 86, as well as other sensor interface circuitry. For example, quadrature counters such as the Quadrature Chip LS7166 from Hewlett Packard can be used to continually read the output of an optical encoder sensor and determine an angular change in sensor position. Microprocessor 86 can then provide the joint angles to host computer 18 or convert the angles to the spatial location of the stylus.

Other types of interface circuitry can also be used. For example, an electronic interface is described in U.S. Pat. No. 5,576,727, which is a continuation of patent application Ser. No. 08/092,974, now abandoned, assigned to the assignee of the present invention and incorporated herein by reference in its entirety. The electronic interface described therein was designed for the Immersion PROBE™ 3-D mechanical mouse and has six channels corresponding to the six degrees of freedom of the Immersion PROBE.

Peripherals 94 are also coupled to I/O circuitry 92 and include foot pedal 71, rotary table 14 (in some embodiments), and any other buttons or other input devices that input information to probe apparatus 12. Peripherals 94 can also include any output devices coupled to the probe apparatus, such as lights, sound speakers, displays, etc. Host computer 18 is also coupled to I/O circuitry 92. In the preferred embodiment, a serial port of computer system 18, such as an RS-232 port, connects the I/O circuitry to computer system 18. Alternatively, a parallel port of host computer system 18 can be coupled to I/O circuitry 92, or a plug-in card and slot or other access of computer system 18.

Figure 2:
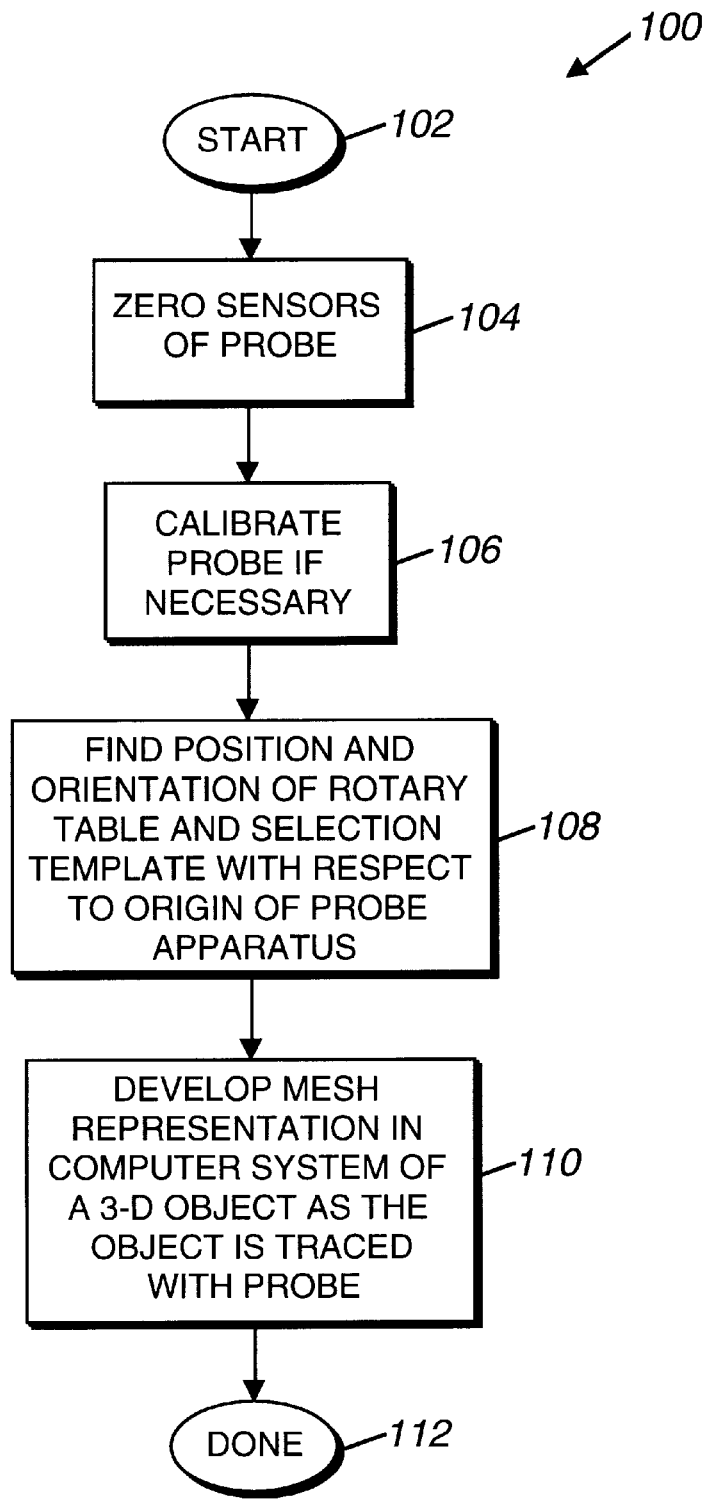
FIG. 2 is a flow diagram illustrating a method of initializing and using the digitizing system of FIG. 1.

FIG. 2 is a flow diagram illustrating a method 100 of initializing and using probe apparatus 12 and rotary table 14 and to develop a mesh representation of object 20 that is manipulable by host computer 18. The process assumes that the user has connected probe apparatus 12 and rotary table 14 to host computer 18 and interface 16. Process 100, as described, presents one example sequence to perform the included steps. In other embodiments, these steps can be performed in other sequences, or some steps can be omitted.

The process begins at 102, and, in step 104, the sensors of the probe apparatus 12 are preferably "zeroed" such that the sensors can reference a known relative orientation of linkages and joint members of the probe apparatus. Such a procedure is typically necessary when using relative sensors, as in the preferred embodiment of the present invention. Relative sensors measure only changes in angular rotation (or translation), and do not measure an absolute angle. The zeroing procedure provides reference angles for the sensors which the sensors can use as a reference point from which to measure. The preferred zeroing procedure of the present invention is described in greater detail with respect to FIGS. 3a and 3b.

In next step 106, the probe apparatus 12 is calibrated, if necessary. Typically, this step is performed by the manufacturer of probe apparatus 12 before the probe apparatus is available to the user, and step 106 is thus usually omitted when a typical user uses the probe apparatus. However, the probe apparatus may become physically stressed such that linkage or joints are bent or otherwise moved relative to other linkages, thus causing error in measurements. The probe apparatus could then be re-calibrated at step 106. A preferred calibration procedure of the present invention for probe apparatus 12 (or other 3-D probe apparatuses) is described in greater detail with respect to FIG. 5.

In next step 108, the position and orientation of rotary table 14, if being used, with respect to the origin in base 33 is found. This step allows interface 16 and/or host computer 18 to reference the rotary table relative to the probe apparatus. When rotary table 14 is turned by the user, host computer 18 then can determine the change in position and orientation of object 20 and compensate so that the user can continue tracing the object at the new location without introducing error to the mesh representation 78 displayed on screen 76. In addition, the position and orientation of the selection template 80 with respect to base 33 can be found in step 108, if the template is being used. Step 108 is described in greater detail with respect to FIG. 6.

In next step 110, a mesh representation 78 of object 20 is developed in host computer system 18 as the object is traced with stylus 22 of probe apparatus 12. The user preferably traces along non-intersecting contour lines along the surface of object 20, as described below. Data points are provided to host computer 18 as the stylus is being traced, and the 3-D mesh representation is developed from the data points. A preferred method of developing a 3-D mesh representation of a 3-D object is described in greater detail with respect to FIG. 11. Step 108 can be implemented multiple times for different objects 20 or the same object 20 without having to again perform steps 104–108 (unless the probe apparatus is powered down). The process 100 is then complete at 112.

Figure 3A:
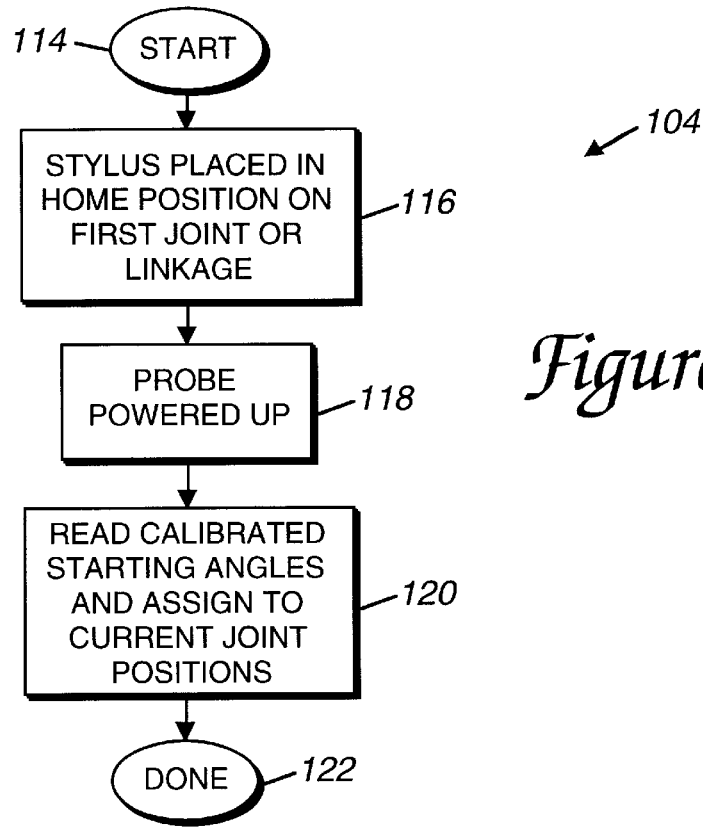
FIG. 3a is a flow diagram illustrating a zeroing process for the probe apparatus of the digitizing system.

FIG. 3a is a flow diagram illustrating step 104 of FIG. 2, in which the sensors of probe apparatus 12 are "zeroed." This process assumes that relative sensors are being used in joint members 24, 26, and 28 of probe apparatus 12. Relative sensors, such as relative optical encoders, are typically less expensive and are thus more preferable than absolute sensors such as absolute encoders, potentiometers, and resolvers. Since relative sensors only measure changes in angular rotation or translation, an absolute angle is derived. In this process, starting reference angles are given so that absolute angles can be derived from relative changes in angles. The process of determining starting reference angles is known as "zeroing" the sensors, since the known starting reference angle is typically considered to be 0 degrees (or the equivalent), and all changes in angle are treated relative to the zero angle.

The preferred zeroing process of the present invention begins at 114, in which the probe apparatus 12 is not yet powered up. In step 116, the stylus 22 is placed by the user in a "home position" by placing the stylus in a receptacle which is preferably on the first joint or linkage of the probe apparatus after base 33. This joint/linkage is member 34 of joint member 28 in the probe apparatus 12 shown in FIG. 1. The home position is a standard position in which the links of linkage assembly 23 of the probe apparatus are always provided at known, predetermined starting angles relative to each other and to base 33. An example of a home position is shown in FIG. 4.

Figures 4, 4A:
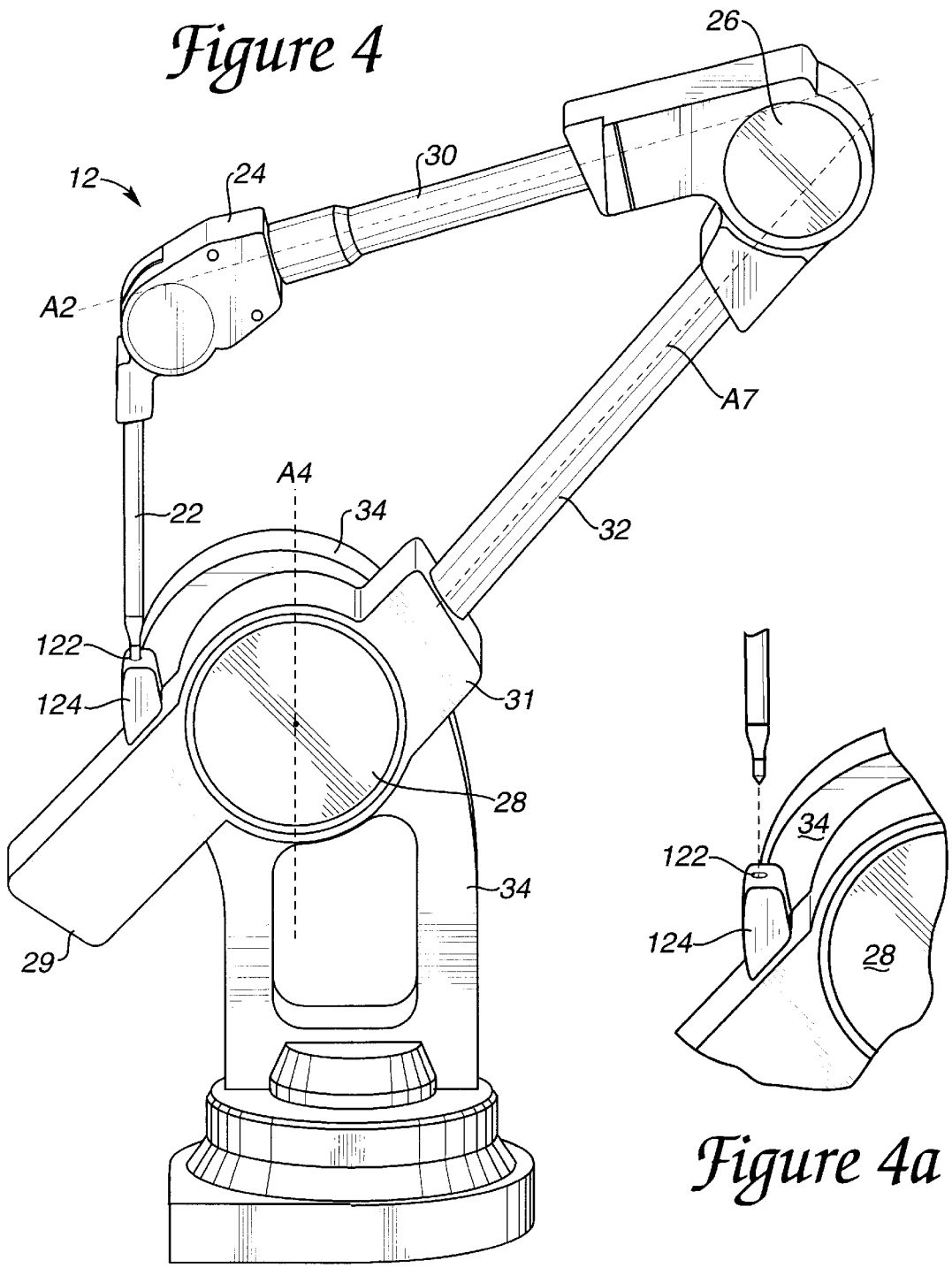
FIG. 4 is a perspective view of the probe apparatus of FIG. 1 in a home position.
FIG. 4a is a detail view of the aperture for holding the stylus in the home position.

FIG. 4 is a perspective view of probe apparatus 12 where the probe apparatus 12 is in a home position of the present invention. Stylus 22 has been placed into an aperture 122 on a stop 124, where stop 124 is coupled to member 34, as shown in greater detail with respect to FIG. 4a. Stop 124 prevents joint member 28 from rotating past a certain point about axis A4. When stylus 22 is in aperture 122, then linkage 32, linkage 30, and stylus 22 are positioned at known "starting angles." That is, it is assumed that the stylus has been placed in aperture 122 and that the linkage assembly is in this home position when the probe apparatus is powered up. Each joint member 24, 26, and 28 is at a particular starting position having a known starting angle. It is these starting angles that are considered the zero position for the sensors of probe apparatus 12. When stylus 22 is moved by a user, the change in angles of linkage assembly 23 from the home position starting angles is read by sensors 54. Each new position of stylus 22, when sampled, is defined in terms of the angle change from the home position. The angle changes can then be converted into coordinate values.

The home position of FIG. 4 is specifically arranged so that stylus 22 can fit in aperture 122 only when the home position shown in FIG. 4 is assumed by the linkage assembly 23, i.e. only one physical configuration of the linkage assembly is possible when stylus 22 is placed in aperture 122. Thus, if linkage 24, for example, is rotated 180 degrees about axis A2, stylus 22 cannot fit into aperture 22. This prevents undesired configurations of the linkage assembly that provide different angles to the joints of the probe apparatus than the assumed starting angles.

In the present invention, stylus 22 is placed in an aperture of member 34 which is closest to and one joint removed from base 33. This has the advantage that sensor 54e is not included in the home position and does not have to be assigned an assumed starting angle. With less joint angles assumed, the less error that is introduced into the zeroing process. Also, linkage assembly 23 may be rotated about axis A5 without affecting the home position of the probe apparatus 12. Member 34 is not at a known starting angle; however, it is not necessary to know the starting angle for member 34 relative to base 33, since the angle with respect to support surface 37 or other areas external to probe apparatus 12 is not required to zero the sensors. Member 34 thus may conveniently be positioned at any angle relative to base 33, and that angle is considered the zero angle.

Referring back to FIG. 3a, in next step 118, probe apparatus 12 is powered up. For example, the user can activate a power switch located at base 33 of probe apparatus 12. Normal calibration parameters for the probe linkage lengths, etc., as described with reference to FIG. 5, can also be loaded upon power-up. In next step 120, interface 16 (or host computer 18) reads calibrated starting angles from a memory or storage device of probe apparatus 12, such as EPROM 90 and assigns the calibrated starting angles to the current positions of the joints. The calibrated starting angles are fine-tuned starting angles which compensate for slight manufacturing deviations in the linkages and joints of the probe apparatus. For example, a probe apparatus may be positioned generally at the desired angles, but may be positioned a few degrees or fractions of a degree from the desired starting angles (due to, for example, manufacturing variation). To allow greater accuracy in digitizing 3-D objects, calibrated starting angles of a probe arm are stored in a memory device of each probe arm. These starting angles are slightly different for each manufactured probe apparatus 12. In the described embodiment, a starting angle for each of the joints of the provided five degrees of freedom is stored, except for member 34 (since the angle for sensor 54e is not known). In other embodiments, for n joints having known starting angles, only n−1 starting angles need be stored. This is because the final (nth) starting angle can be derived by geometrical techniques from the other known starting angles. Such geometrical techniques are well known to those skilled in the art.

The microprocessor 86 preferably assigns the starting angles to the current sensor positions of the joints by setting angle values to known values. For example, in the preferred embodiment, quadrature chips are used to read angle values from the sensors. The microprocessor can clear the counts in the quadrature chips or set the initial counts to predefined calibrated starting angle counts (where the "counts" can be, for example, counts of notches within optical encoder sensors that can be converted to conventional angle values). The zeroing process is then complete.

Figure 3B:
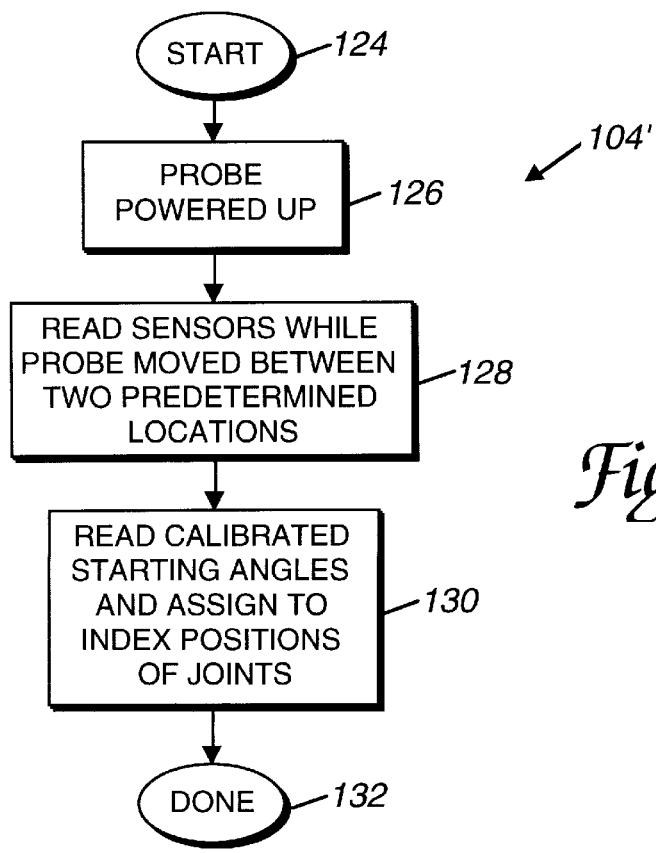

FIG. 3b is a flow diagram illustrating a second, alternate zeroing process 104' to the process 104 described above. In process 104', there is no home position provided. In this embodiment, a reference mark or signal for each sensor 54 is used to determine where the reference zero angles are located on the joints of probe apparatus 12. This embodiment is most appropriate for sensors such as rotary optical encoders, in which a wheel having notches is rotated as the shaft of the encoder is rotated. An emitter of a beam of electromagnetic energy emits the beam through the notches in the wheel and a detector thus detects when notches rotate by to read the change in angle of the sensor shaft. Such encoders, and similar types of sensors, are well known to those skilled in the art.

This second embodiment of a zeroing process uses the notches or similar detected marks of sensors like the optical encoder. An index mark is placed at a predetermined position in the sensing range of each sensor at each joint of probe apparatus 12. For example, in the optical encoders, a wider index notch can be placed on the wheel inside the encoder. The sensor can determine when the wider notch is detected, since it differs from all the other notches. Thus, interface 16 knows where in the range of a sensor that the index mark is located. When the index mark is detected, the starting angle of the joint has been determined, and an assumed starting angle value assigned to that position of the joint.

The process 104' begins at 124, and, in step 126, the probe apparatus is powered up. In next step 128, the user moves the stylus 22 of probe apparatus 12 between two predetermined locations within the working volume with respect to the base 33, and interface 16 reads the sensors as the user moves the stylus. Preferably, the two predetermined locations are designed to allow a natural, fluid motion of the stylus 22 that assures that every index mark of every sensor on the probe apparatus is detected by each sensor and output to interface 16. For example, the two locations can be a point on the base 33 of probe apparatus and a point straight out from the base toward the edge of the working volume. The points do not have to be precise, since the index marks should be designed to be detected by the sensors well within the range of motion provided by the user. This allows a simple, easy motion to zero all the sensors of the probe apparatus. The user can easily move the stylus in a fluid and natural motion without having to separately move each individual joint.

In next step 130, stored calibrated starting angles are read from a memory device of the probe apparatus (or a different coupled memory device) and assigned to the detected index mark positions of the joints. Calibrated starting angles are similar to those described with respect to step 120 of FIG. 3a, and provide additional accuracy to the zeroing procedure. The calibrated starting angles have been compensated for slight physical differences of a particular sensor. Each index mark position of each joint is assigned the corresponding starting angle. The process is then complete as indicated at 132.

Figure 5:
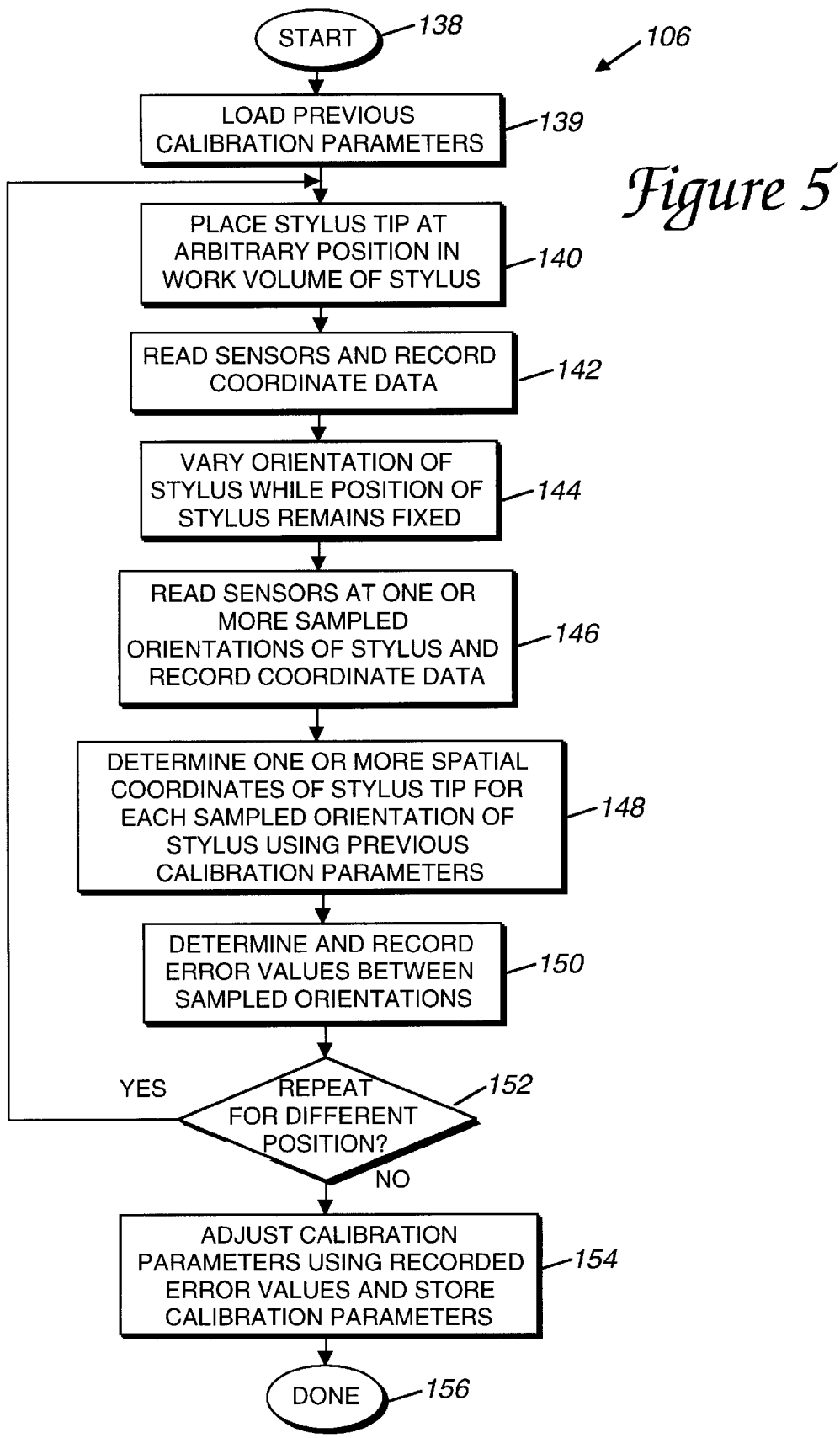
FIG. 5 is a flow diagram illustrating a calibration process of the present invention for the probe apparatus of FIG. 1.

FIG. 5 is a flow diagram illustrating step 106 of FIG. 2, in which the probe apparatus is calibrated, if necessary. This calibration process is typically accomplished for each individual probe apparatus by a manufacturer before the probe apparatus can be obtained by an end-user. The end-user might also desire to perform the calibration process in the event error is introduced into the probe apparatus.

Calibration allows variations in the manufactured parts of probe apparatus 12 to be accounted for and any error associated with the variations substantially removed. Variations including the lengths of linkages, angular offsets between linkages (twists), and linear offsets between axes can be compensated for by storing calibration parameters for each of the joints and linkages of the probe apparatus. For example, the calibration process described herein can more than double the accuracy of the probe apparatus. The calibration process of the present invention utilizes relative errors at any desired probe location, rather than the more tedious and expensive prior art method of calibrating using absolute errors at two known probe locations.

The process begins at 138. In step 139, previous calibration parameters calculated from the last calibration and stored in memory are loaded. If this is the first time that the probe apparatus is being calibrated, then nominal calibration parameters are loaded which, for example, assume ideal dimensions for the probe apparatus. In the preferred embodiment, the calibration parameters are loaded from EPROM 90 of interface 16. Since a given location in the EPROM can only be written to once (burned in) and never erased, the calibration parameters are preferably organized such that a set of parameters is stored only in a specific section of the EPROM. For example, the more recently the calibration parameters were calculated, the higher is the address of EPROM 90 where the set of parameters is stored. Thus, in step 139, the latest, most recent previous calibration parameters can be retrieved from the EPROM. Alternatively, other types of memory, such as battery backed RAM or other types of ROM, can be used to store the calibration parameters; or, host computer 18 can store the calibration parameters.

In step 140, stylus tip 43 is placed by the user, manufacturer, etc. at a freely-chosen position within the work volume of the stylus. For example, a shallow divot on a surface, such as support surface 37, can be provided for this purpose. In next step 140, the sensors of the probe apparatus are read and the current position and orientation of the stylus is recorded. In next step 144, the user manipulates the stylus so that the position of the stylus remains fixed and the orientation of the stylus is varied, i.e., the x, y, and z coordinates of the stylus tip do not change, while the stylus 22 is moved to different orientations. For example, this can be accomplished by placing tip 43 in the abovementioned shallow divot, and rotating the end opposite to tip 43 of the stylus 22 in a conical shape about the divot. In next step 146, the sensors are read at one or more sampled orientations of the stylus. A sampled orientation includes angle values from all sensors on the probe apparatus at a particular stylus orientation. The position (x, y, z coordinates) of the stylus should be the same at each sampled orientation. For example, as the user is moving the stylus in the cone-shaped motion, at least two configurations can be sampled by interface 16 or host computer 18.

In step 148, one or more spatial coordinates of the stylus tip 43 are determined for each sampled orientation of the stylus. The angle values at each orientation that were read in step 146 are used with well-known kinematic equations to derive x, y, and z position coordinate values for each sampled orientation (as is normally accomplished when the position and orientation of stylus 22 are determined during digitizing operation). The previous (or nominal) calibration parameters are used in these kinematic equations. In next step 150, error values between the x, y, and z coordinates of the sampled orientations are determined and stored, preferably in the memory device of the probe apparatus. If the probe apparatus were perfectly calibrated, there would be no difference between the x, y, and z coordinates of the different sampled orientations, since the stylus tip was fixed at one position. However, small variations in the probe apparatus cause errors to be introduced when the joints are rotated, as when the orientation of the stylus is varied. Thus, the kinematic equations will typically produce x, y, and z coordinates that are slightly different for each sampled variation. The differences between these derived coordinates are stored. For example, if three sampled orientations are read, the x coordinates are compared between each of the sampled orientations. The difference between the first and second sampled orientations are stored as one error value, the different between the first and third orientations are stored as a different error value, etc.

In step 152, the process checks if the above steps should be repeated when the stylus is moved to a new, freely-chosen (x, y, z) position that is different from the position chosen previously. This depends on the desired accuracy of the calibration; data collected at more than one stylus position can be combined to achieve more accurate results. If a repeat process is desired, the process returns to step 140, where the stylus tip is placed at a new position and data is collected at that position. If no repeat process is desired, then step 154 is performed, in which the previous or nominal calibration parameters are adjusted using all recorded error values, and the adjusted calibration parameters are stored in a storage or memory device. For example, an optimization procedure can be implemented which adjusts the calibration parameters until the error values are at a minimum or under a predetermined threshold. Such optimization procedures using known calibration parameters and error values are well known to those skilled in the art. Once the calibrations parameters have been adjusted to the desired amount, they are stored. These calibration parameters can thus be used every time the probe apparatus is powered up and used. In the preferred embodiment, the calibration parameters are burned into a particular section of EPROM 90, as described above. Whenever the probe apparatus is powered up, as in the zeroing process of FIG. 3a or 3b, only the latest, most recently determined calibration parameters are loaded. Using such a method, the EPROM 90 can store a number of sets of calibration parameters before its storage space is exhausted. The process is then complete at 156.

The calibration process of the present invention allows a user to pick an arbitrary or random point in the work volume of the probe apparatus and vary the orientation of the stylus at that point. Thus, the stylus preferably has at least five degrees of freedom to allow the stylus orientation to be varied. This procedure provides highly accurate calibration values and avoids the expensive, tedious methods of the prior art in which the stylus must be placed at several locations whose locations are precisely known.

Figure 6:
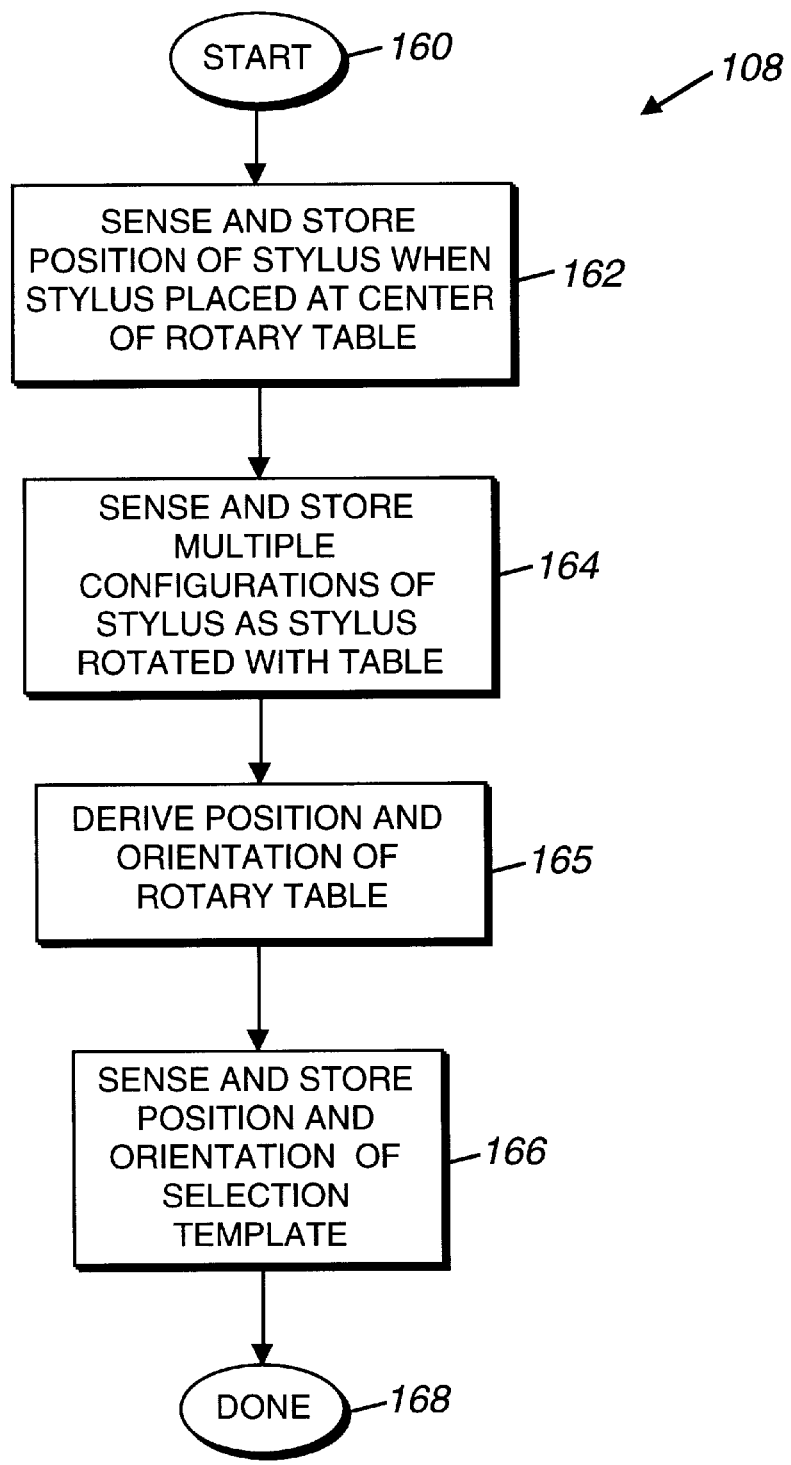
FIG. 6 is a flow diagram illustrating a process of initializing a rotary table and selection template of the present invention.

FIG. 6 is a flow diagram illustrating step 108 of FIG. 2, in which the position and orientation of the rotary table 14 and selection template 80 are determined with respect to the origin at base 33 so that these items may be used during a digitization process. The determination of the coordinate information for the rotary table is described first, although the template and table initializations can be performed in any desired order. In addition, depending on the accuracy desired, either of steps 162 and 164 can be omitted from the present process in alternate embodiments.

Steps 162–165 are provided to locate rotary table 14 relative to the probe apparatus 12. The process begins at 160, and in step 162, the position of rotary table 14 is determined and stored on a storage or memory device, such as a device of host computer 18. More specifically, the position of the center of rotary table is determined using stylus 22 of probe apparatus 12. Preferably, a sleeve, aperture, or other receptacle is positioned in the middle of the rotary table into which the stylus can be inserted to provide a precise position of the rotary table 14 with respect to the base of linkage assembly 23. For example, referring to FIG. 7, rotating surface 60 of rotary table 14 includes a recessed sleeve or divot 170 positioned in the center of rotating surface 60 and able to receive tip 43 of stylus 22. Once stylus 22 is placed in sleeve 170, the probe controller can read and record the angles of sensors 54 of probe apparatus 12.

Figure 7:
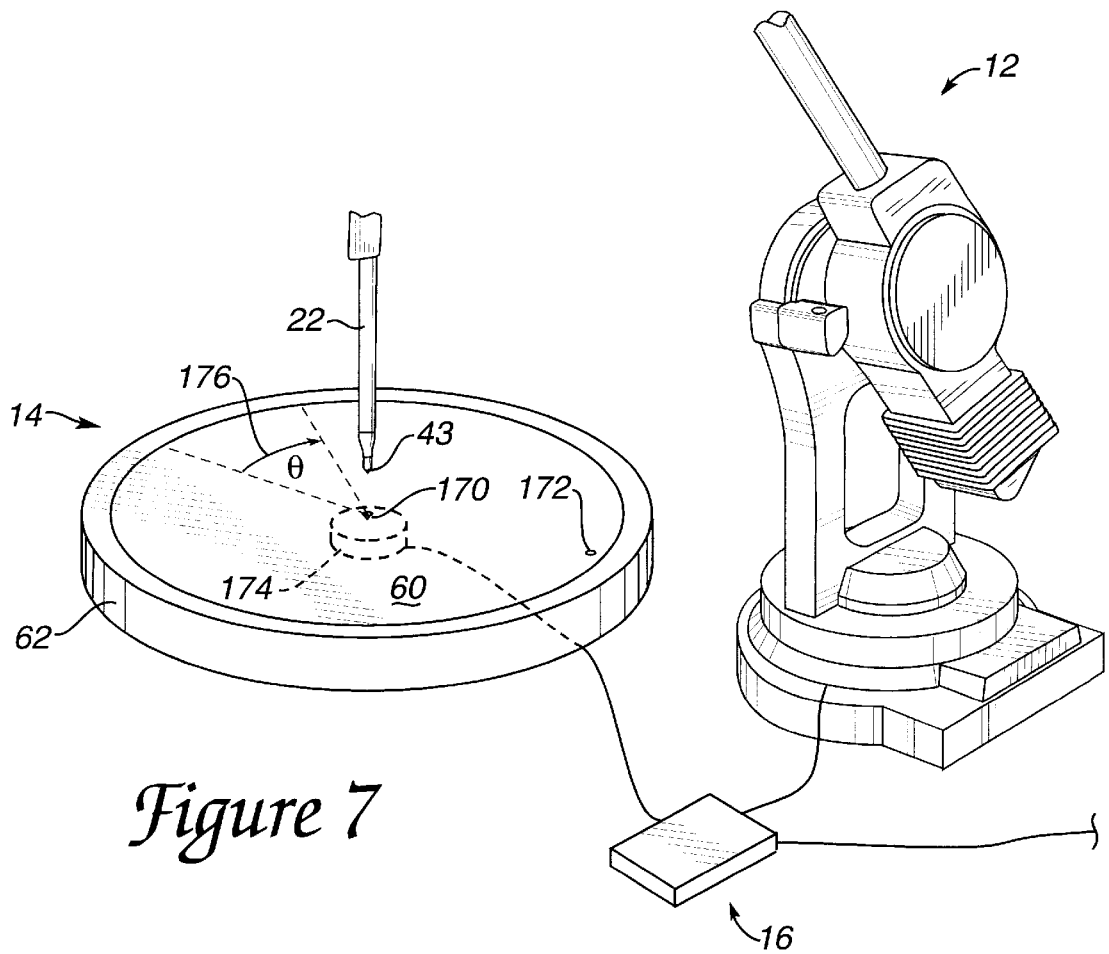
FIG. 7 is a perspective view of the rotary table of the present invention.

In next step 164 of FIG. 6, multiple configurations of the stylus are read and recorded as the stylus is rotated with the table. Referring to FIG. 7, a shallow divot 172 or similar receptacle is preferably placed near the periphery of rotary table 14. The user places tip 43 of stylus 22 in the divot 172 and rotates the table while keeping stylus 22 placed in the divot. As the stylus is rotated by the user, interface 16 reads and stores sensor angle values at multiple stylus positions from both sensors 54 of probe apparatus 12 and sensor 174 of the rotary table (described below). Preferably, at least three different sets of angles are read and stored as coordinates as the stylus is rotated. In an alternative embodiment, the user can move the stylus to multiple points on the periphery of the rotating surface 60 by picking up the stylus and moving it to the new points, rather than rotating surface 60 with the stylus.

In step 165, the position of the center of the rotary table 14 with respect to base 33 and the orientation of the plane of the surface of turntable 60 with respect to the orientation of the plane of arm base 33 are preferably determined. In some embodiments, the difference in orientations of the turntable 60 and base 33 can be assumed to be zero if both table 14 and probe apparatus 12 rest on a flat surface. These features of the rotary table are derived from the angle values read in steps 162 and 164 using geometrical techniques, as is well known to those skilled in the art. The center of the table can also be determined just using the data collected in step 164; however, the data from step 162 provides a more accurate determination. Thus, the location and orientation of the rotary table with respect to the base of the probe apparatus is determined.

In an alternate embodiment, steps 162–164 can be omitted by coupling the rotary table 14 to base 33 of probe apparatus 12. For example, a connecting member can be coupled to base 33 at one end and to table base 62 at its other end. The rotary table would thus be at a fixed, known position and orientation with reference to the probe apparatus 12, and the locating process of steps 162–166 would not be necessary. In such an embodiment, calibration factors can also be determined and stored for the rotary table, similarly to the starting angles for the home position of the probe apparatus as described in FIG. 3a, to compensate for variations in dimensions in individual probe/table apparatuses.

Referring again to FIG. 7, rotary table 14 includes a sensor 174 which is preferably positioned at the center of the table 14 and is coupled to base 62. The sensor shaft can be coupled to rotating surface 60. Sensor 174 can be an optical encoder as described above or a different type of sensor, such as a potentiometer, resolver, hall effect sensor, etc. Alternatively, sensor 174 can be positioned near the edge of rotating surface 60.

Sensor 174 is operative to sense the rotation of rotating surface 60. For example, if the user rotates the surface 60 by θ degrees in the direction shown by arrow 176 so that object 20 is at a new position (and orientation), sensor 170 detects this amount of rotation and transmits the information to interface 16 and/or host computer 18. Thus, when the probe apparatus provides angle values when tracing the object at the new position, a coordinate transformation can be applied to the angle data using the known θ value to derive the new position and orientation of the object. Such a coordinate transformation is well known to those skilled in the art. This allows the user to rotate the object to gain easier access to different surfaces on the object and then continue tracing the object with minimal distraction and very little loss in accuracy. This avoids the time-consuming and error-prone methods of the prior art, which require a user to provide new coordinate information about the object at its new rotated position by pointing the stylus to several points on the object. The coordinate transformation can be performed by host computer 18 that receives independent data from probe apparatus 12 and rotary table 14. Or, interface 16 can perform the transformation and provide transformed coordinates to host computer 18.

Interface 16 is also shown in FIG. 7. Rotary table 14 preferably is coupled to interface electronics 16 which are positioned within the probe apparatus 12. Probe apparatus 12 thus provides signals from the sensors of probe apparatus 12 as well as the sensor 174 of rotary table 14 to a single I/O port of host computer 18. Alternatively, the interface electronics can be housed in a discrete box that is separate from probe apparatus 12 and rotary table 14, as shown in FIG. 7. Alternatively, interface electronics 16 can be housed within rotary table 14. In yet a different embodiment, rotary table 14 can include sensor interface circuitry only for rotary table 14, and can provide angle information to interface electronics 16.

In a different embodiment, rotary table can be provided with its own interface electronics that are independently routed to a second I/O port of host computer 18 that is different from the I/O port receiving information from probe apparatus 12.

Figure 8:
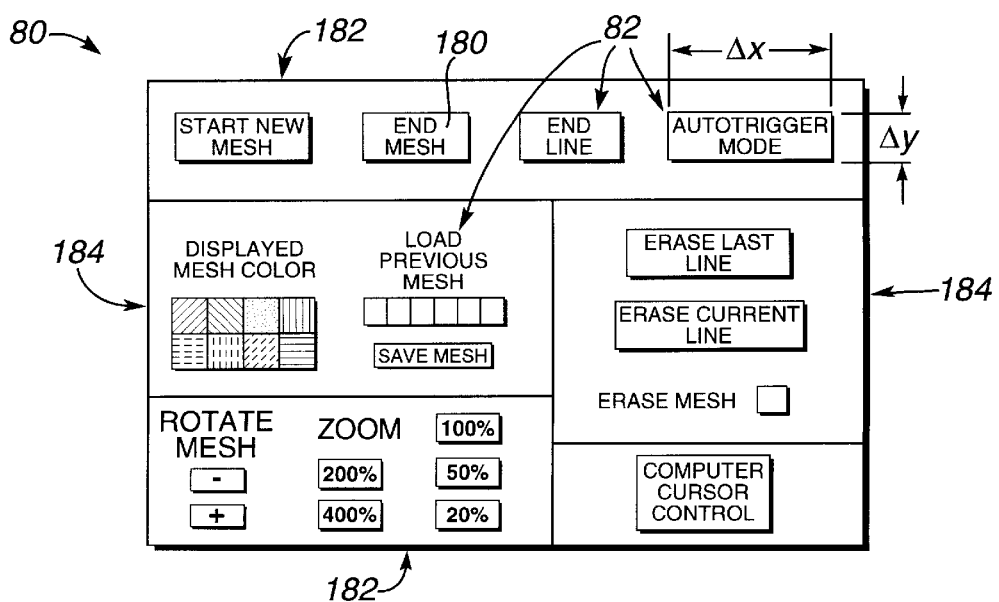
FIG. 8 is a top plan view of the selection template of the present invention.

Referring back to FIG. 6, in next step 166, the position of selection template 80 with reference to probe apparatus 12 is sensed and stored. An example of a selection template 80 is shown in FIG. 8. Template 80 includes selection areas 82, which can include icons, shapes, letters, numbers, words, etc. The user may position tip 43 of stylus 22 within, for example, icon 180, to activate a function of software that host computer 18 is running or a function of probe apparatus 12 or even rotary table 14. As explained above, template 80 does not require any separate sensing apparatus such as a computer tablet or the like, since the probe apparatus 12 can be used to uniquely locate selection areas 82 and provide commands based on selections of stylus 22.

To sense and record the position of selection template 80 with respect to base 33, various methods can be used. For example, the user can position the stylus at a top or bottom boundary 182 and a left or right boundary 184. The host computer would thus be informed of the precise location of a planar, rectilinear template 80 within the working volume of probe apparatus 12. Or, the stylus can be positioned at three reference points, for example, that are located at the corners of the template. The host computer can be provided with predetermined functions that are to be implemented if the stylus is within a specific selection area 82 referenced as a position offset from an edge of template 80. For example, "autotrigger mode" can be activated using the template shown in FIG. 8 if stylus tip 43 is first found to be within the template boundaries 182 and 184, and is also found to have an offset within Δx, Δy from the left and top edges (i.e., within selection area 82). Selection area 82 examples of FIG. 8 include commands to manipulate mesh representation 78, such as "end mesh", "end line", "erase mesh", etc. Many of these commands are described in greater detail with reference to FIG. 11. Other methods can also be used to position template 80 with reference to probe apparatus 12 and to determine functions selected within the template 80. The process of FIG. 6 is then complete at 168.

Figure 9:
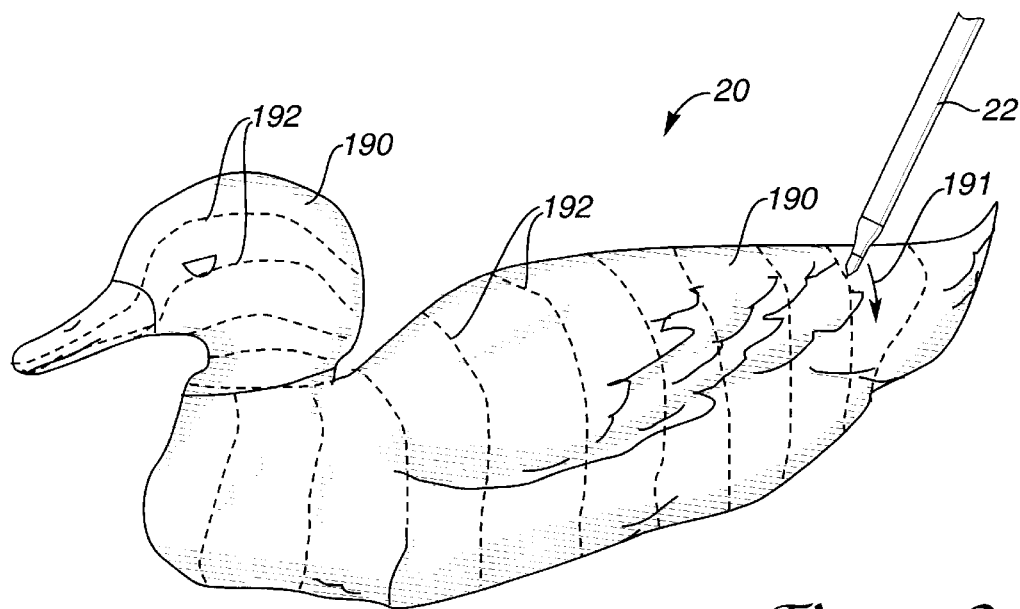
FIG. 9 is a perspective view of an object that is to be digitized by the present invention.

FIG. 9 is a detailed view of object 20 that is to be traced to develop a mesh representation. Object 20 has a surface 190 shown with surface lines 192 displayed thereon. The user can contact the surface 190 of object 20 with stylus 22 and trace the stylus along these surface lines 192, as shown by arrow 191. Typically, surface lines 192 need not be actually drawn on object 20; the user simply has to trace stylus 22 generally along the surface 190 following paths similar to lines 192. Alternatively, the user can draw or etch surface lines 192 on surface 190 to help to guide stylus 22 on the object. As the user traces surface lines 192, data points are sampled along the surface lines by the sensors 54 of probe apparatus 12, as described below. The data points are then sent from the probe apparatus 12 to host computer 18. The data is sent either sent as raw angle data from interface 16, which the host computer converts to coordinates (x, y, z and roll, pitch, yaw); or, the angle data is converted to coordinate values by interface 16 and then sent to computer system 18.

For the method of the present invention, there are general preferred guidelines to follow when tracing surface lines 192 on the surface 190 of an object. Surface lines 192 should be consecutively traced on object 20, i.e., a surface line should not be traced between two other surface lines that have both previously been traced and defined as contour lines (see FIG. 10). Also, the data points in a surface line 192 should be entered consecutively, i.e., a point should not be specified between two points that have been previously defined on the same surface line 162. The method of the present invention, however, allows the surface lines to be traced in either of the two possible directions, regardless of the direction that previous surface lines were traced (detailed below).

Figure 10:
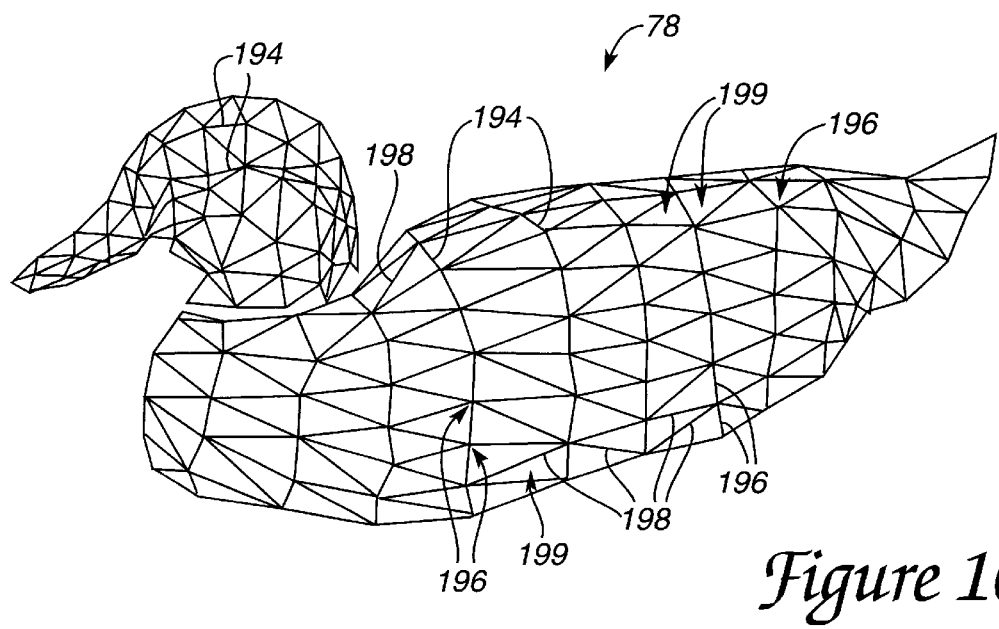
FIG. 10 is a diagrammatic view of a mesh representation of the object shown in FIG. 9.

FIG. 10 is an illustration of mesh representation 78 (also referred to as a "mesh") that is developed by host computer 18 using the method of the present invention after a user has traced surface lines 192 of object 20 shown in FIG. 9. Mesh representation 78 includes contour lines 194 which are computer-generated lines that generally follow corresponding surface lines 192 on object 20 which the user traced. Contour lines 194 each include a number of points 196 which were provided as angle values or coordinates to host computer 18 from probe apparatus 12. Each point 196 describes a corresponding surface point on surface 190 of object 20. Herein, "point" or "data point" refers to the data, such as angle values or coordinates, that describe the current position and orientation of the stylus 22, while "surface point" refers to the corresponding portion on the surface of the object which is pointed to by the stylus 44. Each point, after being converted from angle data to coordinate data, includes x, y, and z position data as well as roll, pitch and yaw orientation data.

Computer system 18 receives points 196 and connects the points to form contour lines. Mesh lines 198 are also added to connect the points 196 of one contour line to the points 196 of an adjacent contour line. The creation of mesh lines for the present invention is described in greater detail in the process of FIG. 11. Mesh lines 198 and contour lines 194 define triangles 199, as described below. Mesh representation 78 can be manipulated by host computer system 18 in many ways, as is well known by those skilled in the art. For example, mesh representation can be rendered and displayed having color and surface shading to create a realistic-looking 3-D representation; or mesh representation 78 can be rotated, copied, or edited as the user desires using functions of computer system 18.

Figure 11:
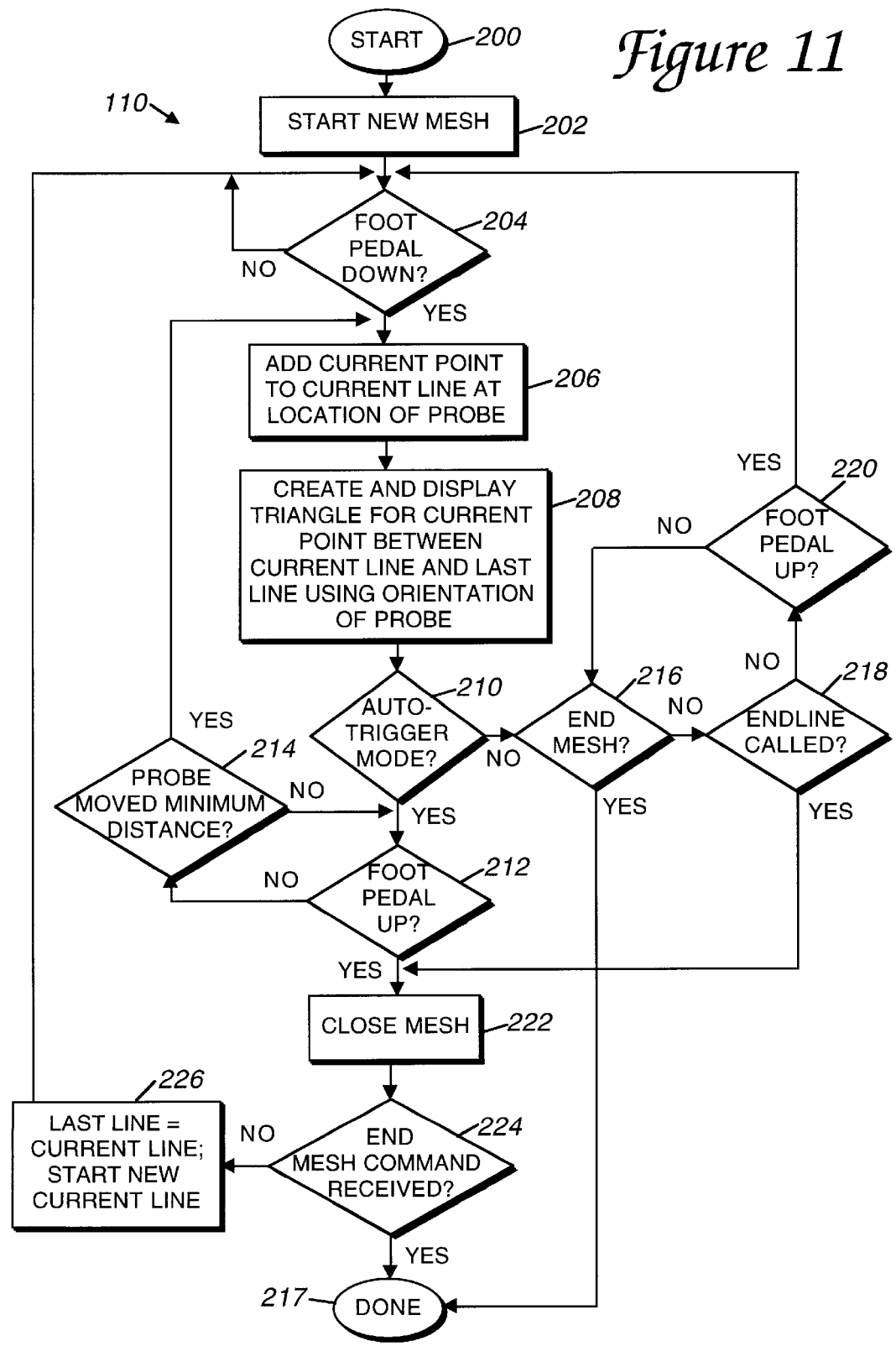
FIG. 11 is a flow diagram illustrating a process of the present invention for developing a mesh representation such as the one shown in FIG. 10.

FIG. 11 is a flow diagram illustrating step 110 of FIG. 2, in which a mesh representation of object 20 is developed by computer system 18 using a preferred method of the present invention. The process begins at 200. In step 202, a start new mesh command is received by host computer system 18 from the user. This command can be entered by the user using standard interface devices or using selection template 80. In next step 204, the process checks if the foot pedal 71 is down, i.e. has been activated by the user. In other embodiments, other activation controls can be checked, such as a button on stylus 22, etc. If the foot pedal is not activated, then the process continues to wait at step 204 for the user to activate the foot pedal. Once the foot pedal is activated, step 206 is implemented, in which the current point pointed to by tip 43 of stylus 22 is input to the host computer system 18 and is added to the current contour line. If this is the first point entered for a line, then that point begins a new contour line.

In next step 208, a triangle is created for the current point between the current contour line and the last contour line using the orientation of stylus 22 or other used probe device. The created triangle is also preferably displayed in this step, although the triangle need not be displayed in other embodiments. This step is described in greater detail with reference to FIG. 12. One of the advantages of the method of the present invention is that points and triangles are incrementally added to mesh representation 78 and displayed to the user as the user adds each new point when tracing. The user can thus view display screen 76 and quickly determine if a mesh is being created properly during the tracing process, i.e., the user does not have to wait until the entire object is traced before viewing the resulting mesh representation. Another advantage of the present invention is that the orientation of the stylus (or other probe) is used to help create triangles in the mesh. This is described in greater detail below.

In next step 210, the process checks if auto-trigger mode has been selected by the user. Auto-trigger mode allows points to be input to computer system 18 from probe apparatus 12 automatically while the user traces surface lines 192. If auto-trigger mode has been selected by the user (either before the current contour line was begun or during the input of the current line), then step 212 is implemented, in which the process checks whether foot pedal 71 is "up", i.e., deactivated. In the preferred embodiment, in auto-trigger mode, points are automatically input to host computer system 18 from probe apparatus 12 as long as the user continues to activate foot pedal 71 (and the stylus moves a minimum distance, explained below). Once the user releases (deactivates) the foot pedal, points will no longer be automatically entered. If the foot pedal is up, then the process continues to step 222, detailed below. If the foot pedal is still down in step 212, the process continues to step 214, where the process checks if the stylus 22 has been traced for the minimum distance. In the preferred embodiment, a point is automatically input to computer system 18 when the stylus 22 has been moved a minimum predetermined distance by the user along a surface line. For example, the minimum distance can be set to 0.2 inches. While autotrigger mode has been selected and the foot pedal is being activated, a point will be input to computer system 18 every 0.2 inches the user moves stylus 22. In alternate embodiments, other criteria can be used to determined when points are entered. For example, a minimum length of time can be specified, such as 2 seconds. Thus, while in auto-trigger mode and foot pedal 71 is being activated, a new point is automatically input to host computer 18 every 2 seconds, regardless of the current stylus position.

If the stylus 22 has not been moved the minimum distance in step 214, then the process returns to step 212 to check whether the foot pedal is still being activated. In actuality, steps 212 and 214 (and 210) can be checked simultaneously by host computer system 18 as "events" which may occur at any time, as is well known to those skilled in the art. A foot pedal deactivation in step 212 takes precedence over the other checks. Once the probe has been moved the minimum distance in step 214, the process returns to step 206 to add the current point to the current line at the current position of stylus tip 43.

If auto-trigger mode has not been selected by the user as checked in step 210, then the process checks in step 216 if an "end mesh" command has been entered. An end mesh command indicates that the user is finished entering data and that either the mesh representation is complete or that the user will continue to input data at a later time. Thus, if an end mesh command has been entered, the process is complete at 217. If an end mesh command has not been entered, then, in step 218, the process checks if an "end line" command has been entered by the user. The end line command indicates that the user has finished the current contour line and will enter a new contour line. If an end line command has been entered, the process continues to step 222, detailed below. If no end line command has been entered, then, in step 220, the process checks if the foot pedal is up. In the preferred embodiment, when not in auto-trigger mode, a point is entered by activating the foot pedal once and then deactivating it, i.e., pushing down on the foot pedal and releasing it. If the foot pedal has not been released, then a new point cannot be entered, so the process returns to step 216 to check for an end mesh command, end line command, or a foot pedal deactivation. Similar to steps 210, 212 and 214 described above, steps 216, 218 and 220 can preferably be checked simultaneously. Once the foot pedal has been released in step 220, the process returns to step 204 to check for the foot pedal to be activated again to enter a new data point.

If the foot pedal is deactivated in autotrigger mode from step 212, or if an end line command is received in step 218, then step 222 is implemented. In step 222, the mesh representation 78 is closed. Depending on what points have been entered on the current contour line, this may cause additional triangles to be created in the mesh. Step 222 is described in greater detail with reference to FIG. 17. In next step 224, the process checks if an end mesh command has been received. This is similar to step 216, described above. If an end mesh command is received, then the process is complete at 217. If no end mesh command is received, then it is assumed that the user wishes to enter another contour line, and, in step 226, the last line is set equal to the current line, and a new current line is ready to be received. The process then returns to step 204 to wait for the foot pedal to be activated.

Figure 12:
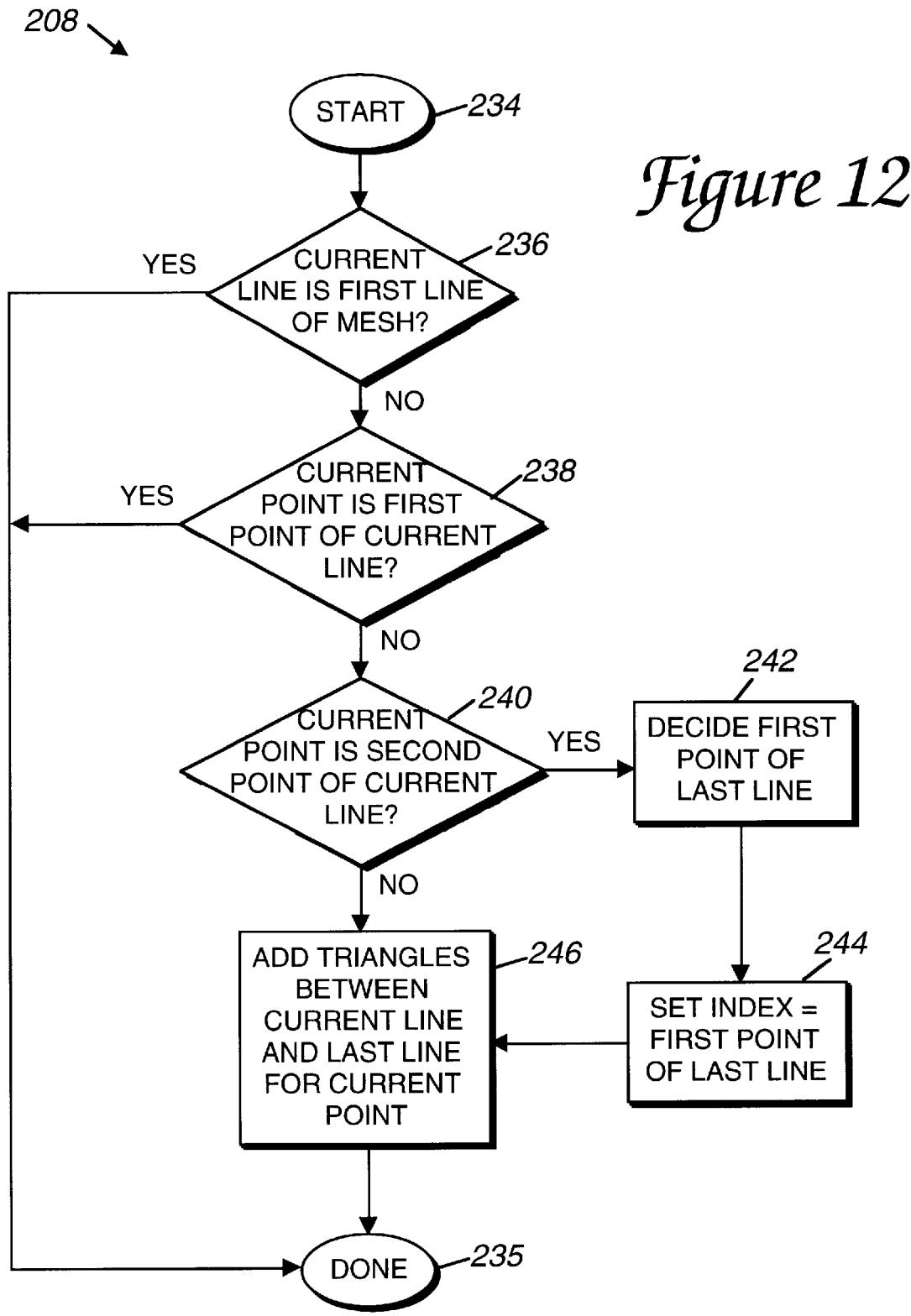
FIG. 12 is a flow diagram illustrating the step of FIG. 11 for creating triangles in a mesh representation.
Figure 13:
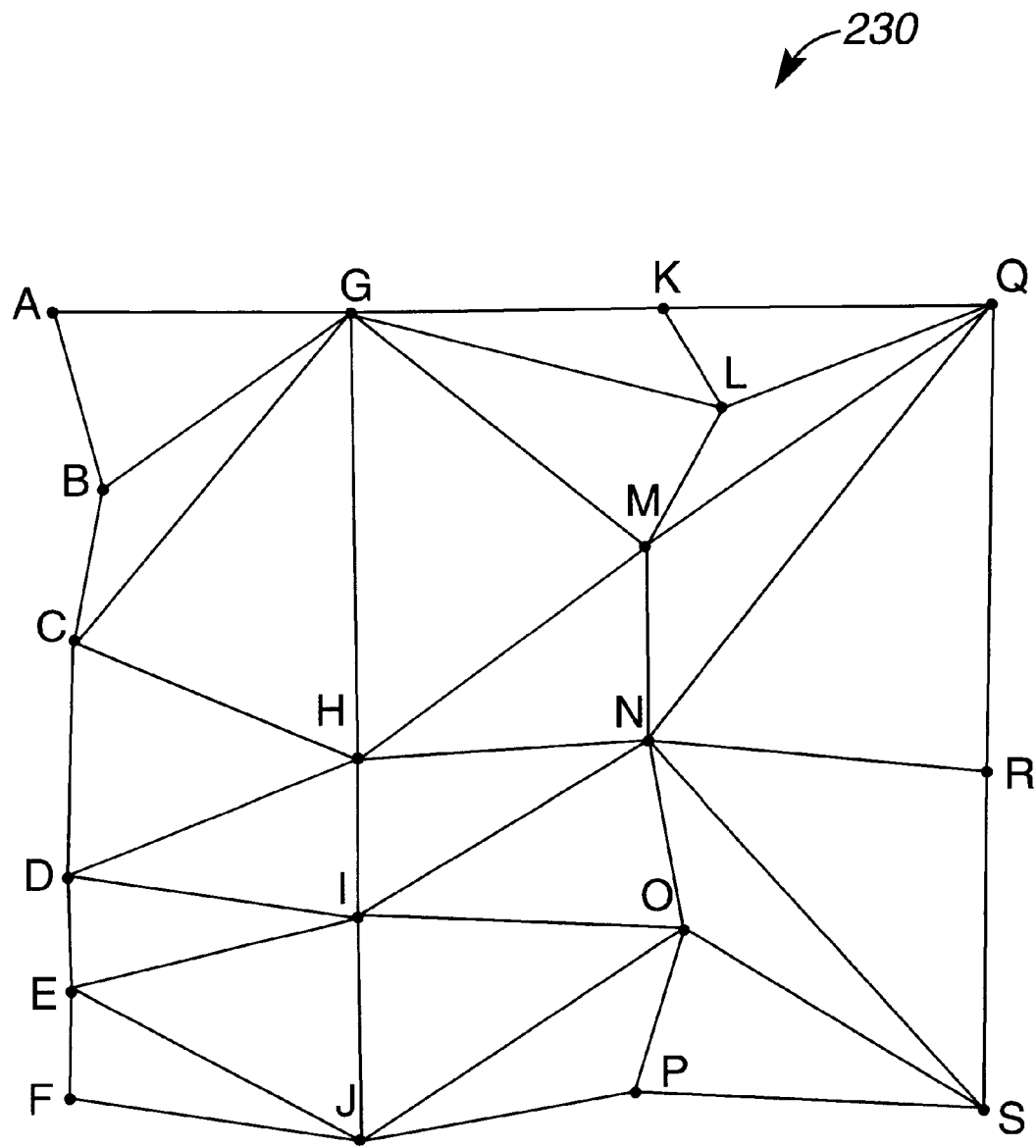
FIG. 13 is a diagram illustrating an example mesh representation developed by the process of FIG. 11.

FIG. 12 is a flow diagram illustrating step 208 of FIG. 11, in which a triangle is created and preferably displayed for the current point between the current line and the last line using the orientation of the probe. During the following explanation, a mesh representation 230 as shown in FIG. 13 and additional figures will be referenced. Mesh representation 230 includes four contour lines: line A-F which includes points A, B, C, D, E, and F; line G-J which includes points G, H, I, and J; line K-P which includes points K, L, M, N, O, and P; and line Q-S which includes points Q, R, and S. Mesh lines are shown between the points of each adjacent contour line. The method of the present invention allows the contour lines to be input in any direction, so the lines can be entered, for example, in the order of A-B-C-D-E-F, or in the order of F-E-D-C-B-A. The points of a mesh representation are located relative to each other by host computer 18 by examining the (x, y, z) portion of each point. The roll, pitch, yaw portion of each point is used to find the normal vectors, described below.

Referring back to FIG. 12, the process begins at 234. In step 236, the process checks if the current contour line is the first line of the mesh representation. If so, then two possible triangles cannot yet be created and one of the triangles selected (as detailed below), so the process is complete at 235. If the current line is not the first line of the mesh in step 236, then, in step 238, the process checks if the current point is the first point of the current line. Since, in the described method, a triangle cannot be created until the second or later point of the current line is entered, the process is complete at 235 if the current point is the first point. If the current point is not the first point, then, in step 240, the process checks if the current point is the second point of the current line. If so, then step 242 is implemented, in which the first point of the last line is decided. Since the last line has two end points, one of those end points is chosen as the first point of the last line. This determines the "meshing direction," i.e., the order of points in the last line which are to be connected with the current line. In the preferred embodiment, the closest point on the last line to the current point is chosen as the first point of the last line. It thus is of no significance in which order the user inputted the points on the last line, since the closest point is chosen. In alternate embodiments, other criteria can determine which point of the last line is chosen as the first point. For example, the process can also check if the points of the last line, when examined in the decided meshing direction starting from the chosen first point, follow a path that is approximately in the same direction the points of the current line. If the directions are not the same, the opposite end point of the last line should be chosen as the first point of the last line.

In next step 244, a variable INDEX is set equal to the first point of the last line. INDEX holds the value(s) (i.e. coordinates or angle values) of a particular point in a contour line. After step 244, or if the current point is not the second point of the current line, then step 246 is performed, in which one or more triangles are added between the current line and the last line for the current point. This is described in greater detail with reference to FIG. 14.

For example, in the mesh representation 230 shown in FIG. 13, line A-F is first entered and is then considered the last line. Point G is the current point. The process of FIG. 12 ends after step 238 since point G is the first point of the line. Next, point H is input and is considered the current point. Since H is the second point of the current line, step 242 decides that point A will be the first point of the last line, since point A is closer to point H than to point F. Triangles are then added between the last line and the current line, as detailed below.

Figure 14:
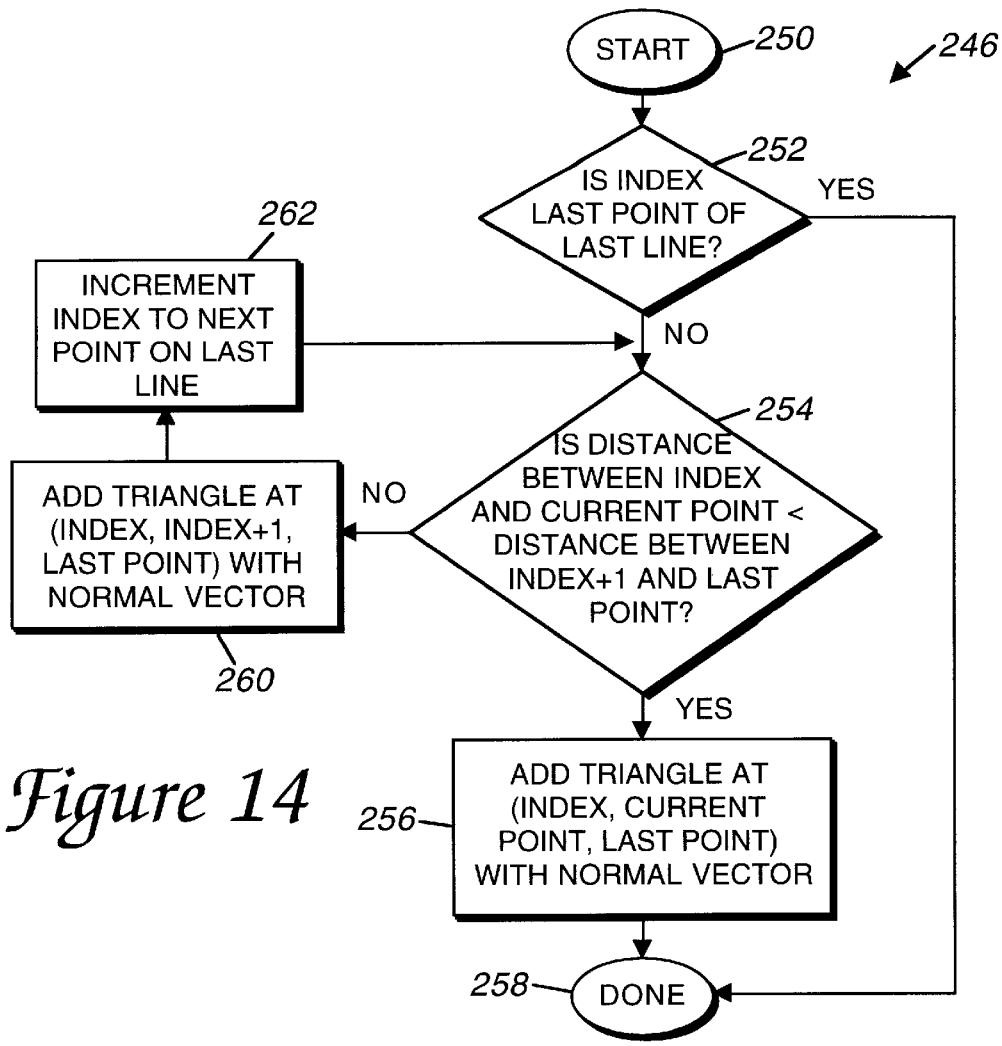
FIG. 14 is a flow diagram illustrating the step of FIG. 12 for adding triangles between two contour lines of the mesh representation.

FIG. 14 is a flow diagram illustrating step 246 of FIG. 12, in which triangles are added between current line and the last line for the current point. The process begins at 250. In step 252, the process checks if INDEX is the last point of the last line. If this condition is true, then no more triangles need be added between the current line and last line, and the process is complete at 258. If INDEX is not the last point of the last line, then, in step 254, the process checks if the distance between INDEX and the current point is less than the distance between INDEX+1 and the last point of the current line ("last point"). This step checks the hypotenuses of two possible triangles that can be added using the current point, as explained below.

Figure 15A:
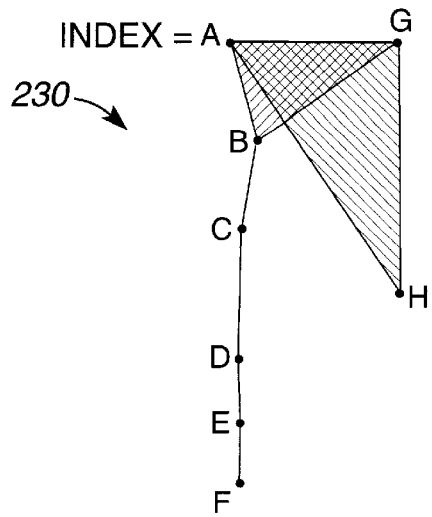
FIGS. 15a, 15b, 15c, 15d, and 15e are diagrams illustrating the method of FIG. 12 for adding triangles using the mesh representation of FIG. 13.

FIG. 15a is a diagrammatic illustration providing a portion of mesh 230 of FIG. 13 as an example. Contour line A-F has been previously entered by the user and is designated the last line. Point G is added as the beginning of a new contour line, and starts the current line. Point H is then added, and point A is chosen as the first point of the last line A-F. After point H has been input, two possible triangles can be created between the current line and the last line: triangle ABG and triangle AHG. In this example, INDEX has been set equal to point A, INDEX+1 is the next point after INDEX, i.e., point B, and the last point is point G. Thus, in step 254 of FIG. 14, the process checks if the distance between point A (INDEX) and point H (the current point) is less than the distance between point B (INDEX+1) and point G (last point), i.e., if hypotenuse AH is less than hypotenuse BG.

Referring back to FIG. 14, if the distance between INDEX and the current point has the lesser value, then step 256 is implemented, in which the triangle at (INDEX, current point, last point) is added to the mesh representation. Preferably, when a triangle is added, the points of the triangle are added to a list of triangles for the mesh. Step 256 also adds a normal vector for the added triangle to the list of triangles. The normal vector is described in greater detail below. For example, as shown in FIG. 15a, this triangle corresponds to triangle AHG. In the example shown, however, this triangle would not be added, since hypotenuse AH is not less than hypotenuse BG. After step 256, the process is complete at 258.

Figure 15B:
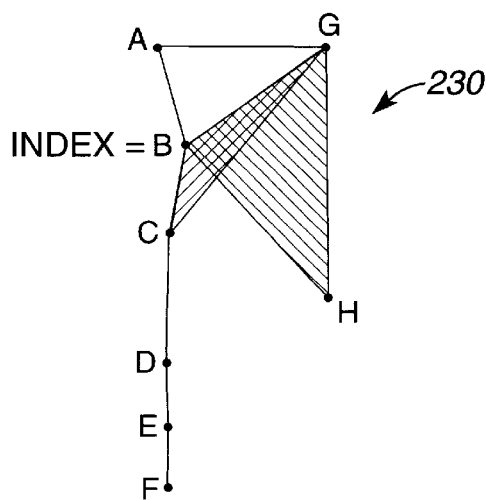

If the distance between INDEX+1 and last point has the lesser value in step 254, then, in step 260, the triangle at (INDEX, INDEX+1, last point) is added to the mesh representation. This step is similar to step 256, i.e., the triangle and normal vector are added to the triangle list. As shown in FIG. 15a, this triangle corresponds to triangle ABG. In the example of FIG. 15a, this triangle would be added, the results of which are shown in FIG. 15b. After step 260, INDEX is incremented to the next point on the last line in step 262. For example, INDEX is set equal to point B once triangle ABG is added, and INDEX+1 thus becomes point C.

After step 262, the process returns to step 254 to check the hypotenuses for the new INDEX points. The process is not complete after step 262 since, if step 254 is false, it indicates that more than one triangle can be added for the current point. Thus, additional triangles are added by checking the conditions of step 254 with the new INDEX point.

Figure 15C:
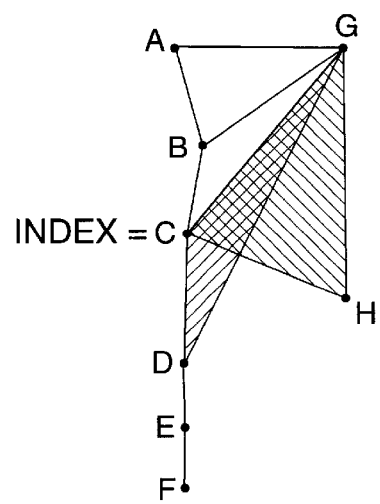
Figure 15D:
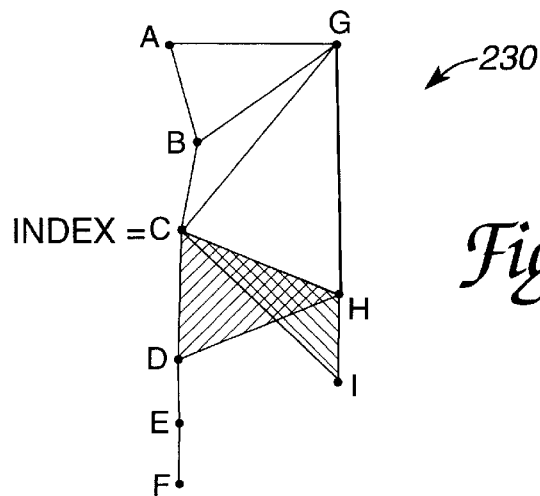
Figure 15E:
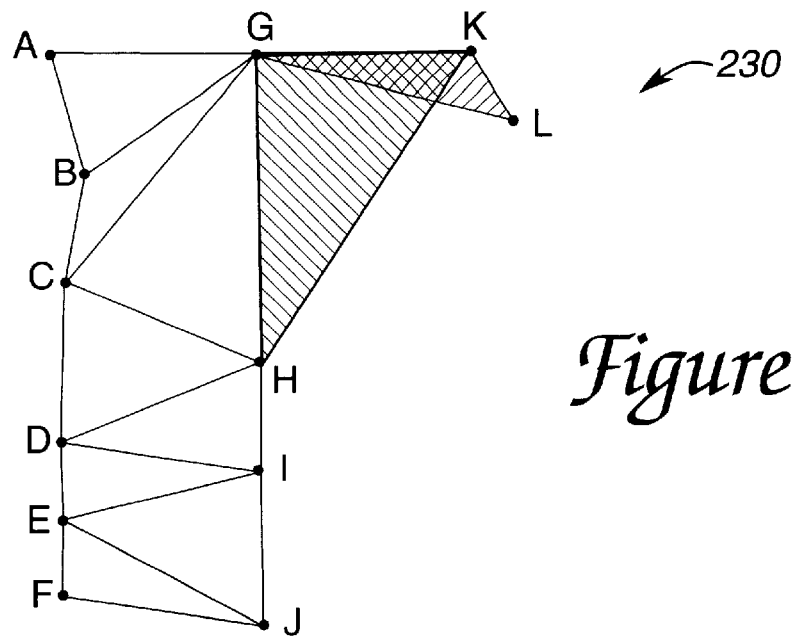

For example, in FIG. 15b, triangle ABG has been added. INDEX is now point B, and INDEX+1 is point C. Step 254 checks if hypotenuse BH has a smaller length than hypotenuse CG. In this example, hypotenuse CG has a smaller length, so triangle BCG is added to the mesh representation, as shown in FIG. 15c. INDEX is again incremented, and thus is now point C. In step 254, the process checks if hypotenuse CH has a smaller length than hypotenuse DG. Hypotenuse CH is smaller, so step 256 adds triangle CHG, as shown in FIG. 15d. The process is then complete at 258, so that a new point is eventually input by the user in step 206 of FIG. 11. Process 246 is then again implemented for new point I as the current point, as shown in FIG. 15d. In step 254 of FIG. 14, the process checks if hypotenuse CI has less length than hypotenuse DH. DH has less length, so the triangle CDH is added in step 260 and INDEX is incremented in step 262. As shown in FIG. 15e, triangles are added until the last point J of the current line is input. A new contour line is then begun with the input of points K and L, and the last line is set to line G-J. Triangles continue to be added to mesh representation 230 in a similar fashion. Thus, in the developed mesh representation of the present invention, a triangle includes one point from the current contour line, one point from the last contour line, and a third point that is either from the current line or the last line, depending on the distances between the examined hypotenuses.

In alternate embodiments, step 254 can check for different conditions to determine which triangle to add to the mesh representation. For example, the area of triangle (INDEX, current point, last point) can be compared to the area of triangle (INDEX, INDEX+1, last point). The triangle with the smallest area can be added to the mesh. Alternatively, the perimeter distance of the two possible triangles can be compared, where the triangle with the smaller perimeter distance is added to the mesh representation. Other conditions can be checked in other embodiments.

Figure 16:
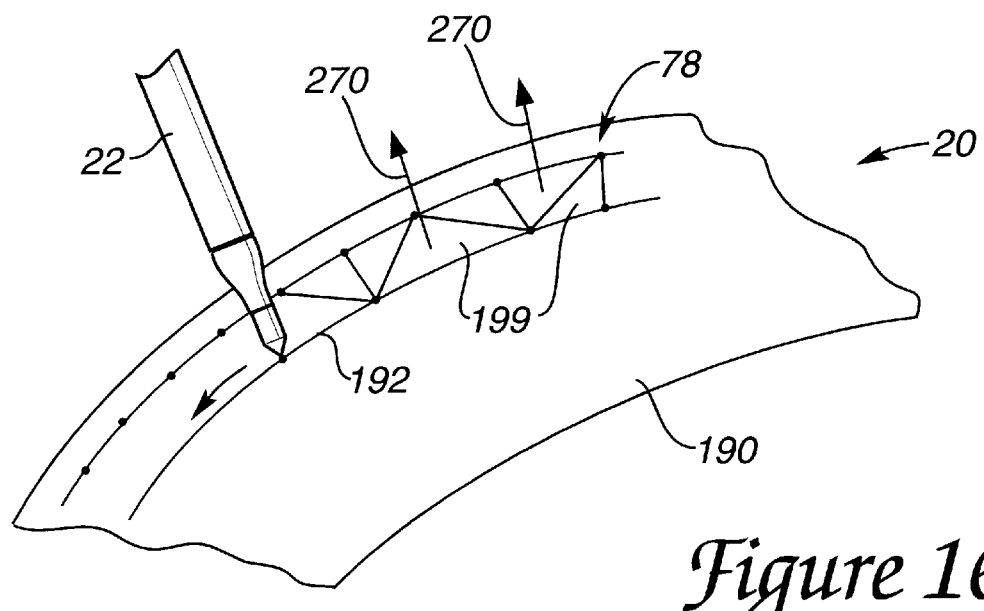
FIG. 16 is a diagram illustrating the normal vectors for triangles added to the mesh representation.

When a triangle is added to the mesh representation in step 256 or step 260, a normal vector for that triangle is also determined. FIG. 16 shows stylus 22 tracing a surface line 192 on object 20. A portion of mesh representation 78 that is being developed in host computer 18 is also shown superimposed on the corresponding surface portion of object 20. Triangles 199 are added to the mesh representation 78 as stylus 22 moves. A normal vector 270 is also determined for each added triangle 199. The normal vector is used by rendering processes and other processes that manipulate a mesh representation to determine which side of a triangle 199 (or other polygon) is facing "outward", i.e. which side of the triangle is the exterior surface of the 3-D object represented by the mesh representation. The normal vector 270 points outward to show which side of a triangle is the exterior surface. For example, processes can use the normal vector information to provide shadows and shading on a rendered object from a virtual light source.

In the present invention, the normal vector 270 for a triangle is quickly and easily determined. The x, y and z coordinates of the points of a triangle 199 define the position of the triangle in space, but do not define the orientation of the triangle. Thus the position of the normal vector is known, but not the orientation of the vector. However, since the stylus of the preferred embodiment has five degrees of freedom, the orientation of the stylus is known and recorded in the points as well as the position. The orientation of a triangle can thus be determined from the orientation coordinates of roll, pitch, and yaw included in each point. Preferably, the orientation of a normal vector is defined as opposite to the orientation of the stylus at the time when the stylus is adding the points of the triangle. This assumes that the external surface of object 20 is being traced (as shown in FIG. 16). In other embodiments, the normal vector can be defined as the same orientation as the stylus. The orientation coordinates of 1–3 points of triangle 199 can be examined to determine the normal vector; since all of these points were traced by the user from the same side of the object (the exterior side), any of the points can be used to determine this direction.

Figure 17:
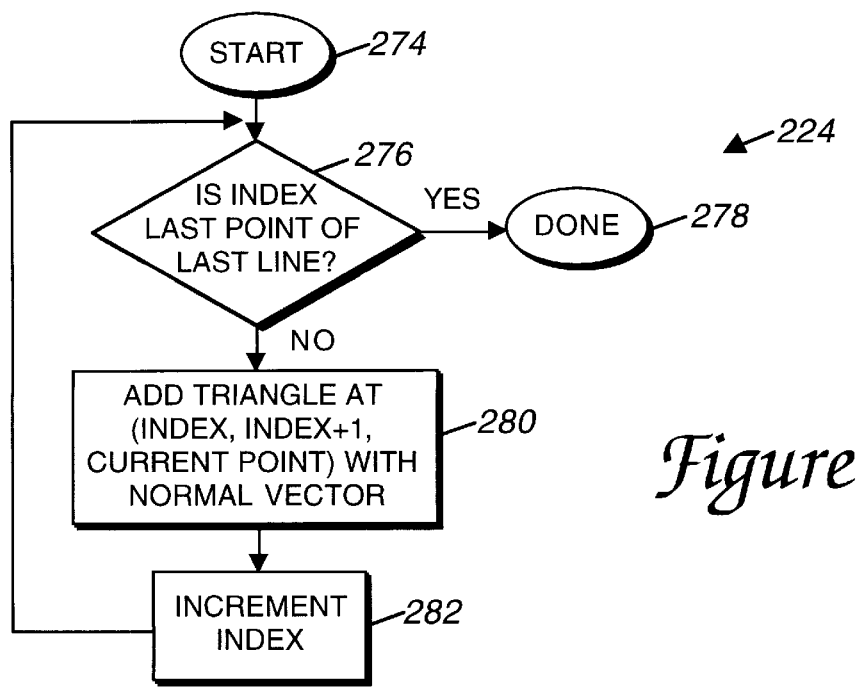
FIG. 17 is a flow diagram illustrating the step of FIG. 11 for closing the mesh representation.

FIG. 17 is a flow diagram illustrating step 222 of FIG. 11, in which a close mesh process is implemented. The process begins at 274. In step 276, the process checks if INDEX is the last point of the last line. If so, then the process is complete at 278. If INDEX is not the last point of the last line, then, in step 280, a triangle (INDEX, INDEX+1, current point) is added to the mesh representation and the triangle list with a normal vector, similar to steps 256 and 260 described with reference to FIG. 14. In next step 282, INDEX is incremented to the next point of the last line, and the process returns to step 276 to check if INDEX is the last point of the last line. An example of this process is described with reference to FIGS. 18a and 18b.

Figure 18A:
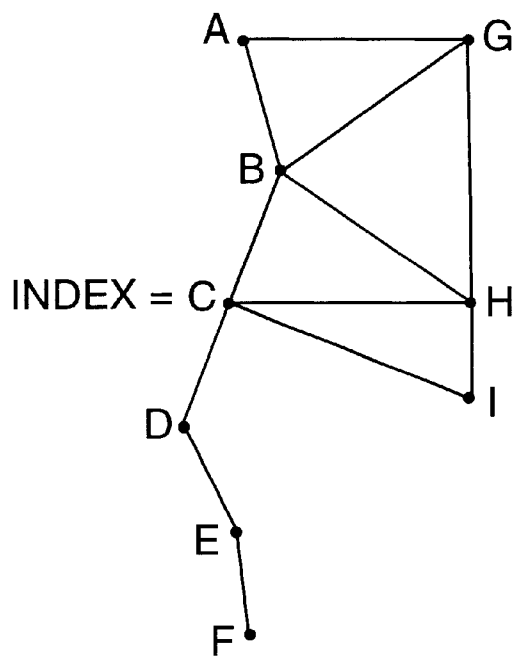
FIGS. 18a and 18b are diagrams of a mesh representation illustrating the process of FIG. 17 for closing a mesh representation.
Figure 18B:
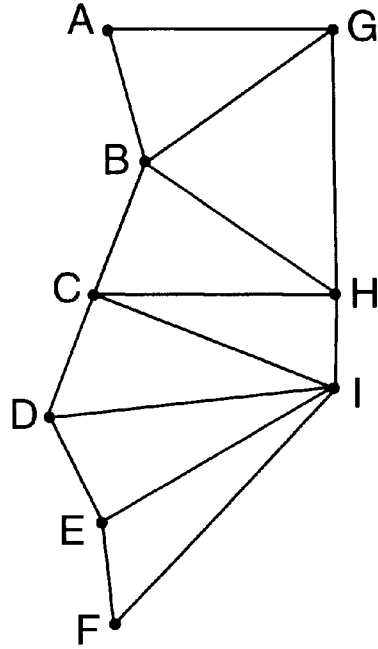

FIG. 18a is a diagrammatic illustration showing a portion of a mesh representation 284 which makes use of the close mesh process of FIG. 17. Line A-F is the last line, line G-I is the current line and point C is INDEX. The user has indicated that point I is the last point of the current line with an end line command; thus, the close mesh procedure of FIG. 17 is implemented. Since point C is not the last point of the last line, step 280 of FIG. 17 adds the triangle at (INDEX, INDEX+1, current point), which in this example is triangle CDI. INDEX is then incremented in step 282. In the next iteration, triangle DEI is added, and in the final iteration, triangle EFI is added. At that stage in the iteration, INDEX (point F) is found to be the last point of the last line in step 276, so that the process is complete at 278. The final mesh representation 284 is shown in FIG. 18b.

Figure 19:
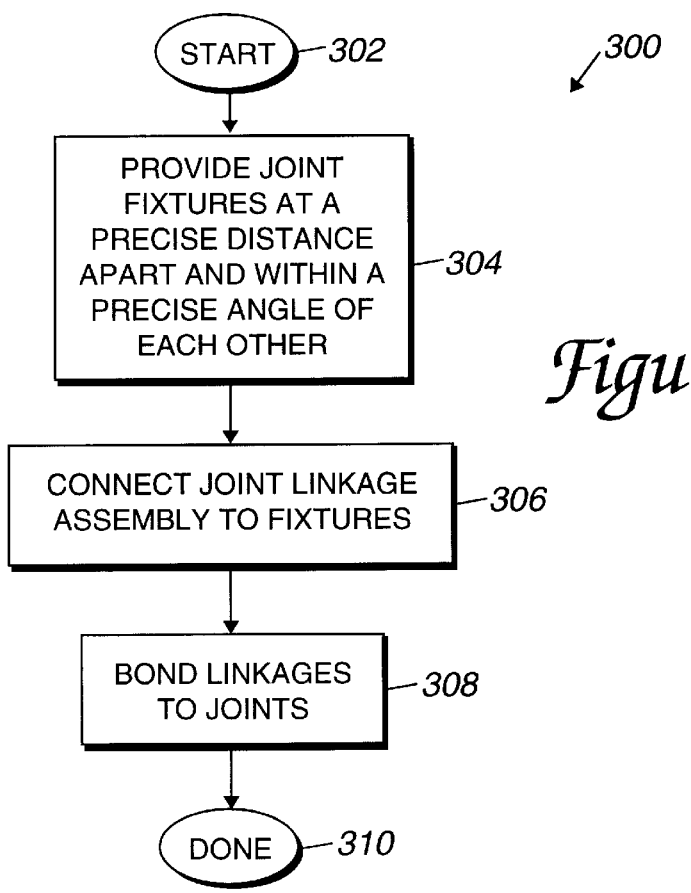
FIG. 19 is a flow diagram illustrating a method of assembling linkage assemblies used in the probe apparatus of FIG. 1.

FIG. 19 is a flow diagram illustrating a preferred assembly process 300 for assembling the precision linkages and joints of probe apparatus 12 or a similar device having such linkages and joints. The process begins at 302. In step 304, joint fixtures are provided at a precise distance apart from each other and within a precise angle of each other. Such joint fixtures are adapted to secure a joint in place, and are well known to those skilled in the art. The precise distance is the desired length of a linkage in the linkage assembly. The precise angle is the desired angle or offset from a linear position between the joints. In next step 306, a joint-linkage assembly is connected to the fixtures such that the joints in the assembly are positioned the precise distance and angle apart. For example, a joint linkage assembly can be connected that includes joint members 24, 26, and 28 and linkages 30 and 32 as shown in FIG. 1. The linkages are preferably loosely connected to the joints so that the joint members can be adjusted to fit into the joint fixtures. In step 308, the linkages are bonded to the joint members at the precise distance and angle. Such a process is well known to those skilled in the art. The bonding process provides negligible residual stress, such that when the joint members are removed from the joint fixtures, they will not deflect or flex.

Figure 20:
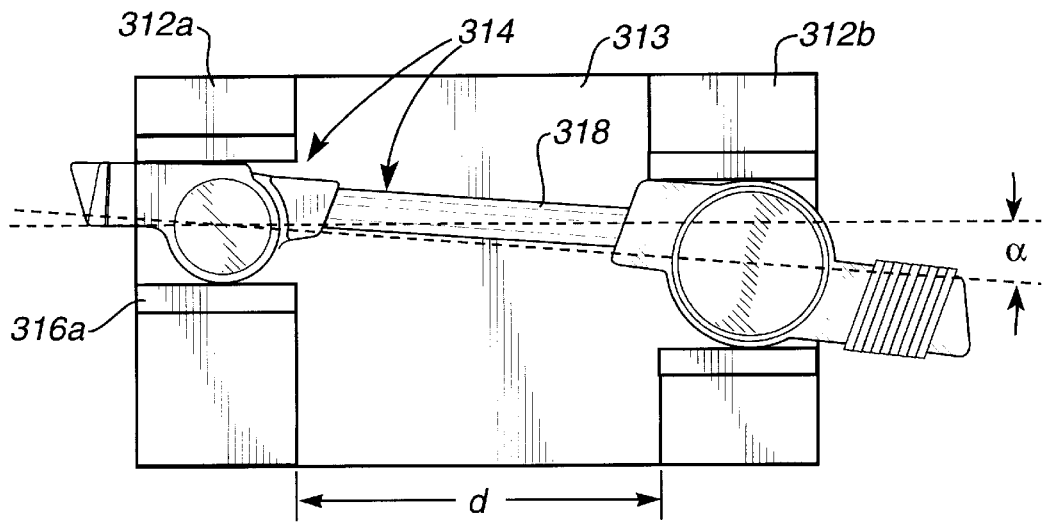
FIG. 20 is a schematic diagram illustrating the method of FIG. 19.

For example, FIG. 20 is a schematic diagram showing joint fixtures 312a and 312b. The joint fixtures are provided a precise distance d apart from one another, where d is a desired length for a linkage in the joint-linkage assembly. The fixtures are also provided a precise angle α offset from each other, if such an offset is desired. The joint fixtures can be coupled together by member 313 to provide a precise position of the fixtures relative to each other. Joint-linkage assembly 314 is placed in the fixtures such that each joint member 316a and 316b is in a fixture and secured in place. After the joint members 316 have been secured, linkage 318 is bonded in place. The described thus provides a simple, inexpensive method for assembling joints and linkages with a high degree of accuracy.

Linkage 318 which is assembled by process 300 and linkages 30 and 32 of the probe apparatus of FIG. 1 are made of graphite in the preferred embodiment of the present invention. Graphite allows linkages to be have a lighter weight, stiffer structure, and be far more temperature stable than linkages of the prior art, which are typically made from aluminum. By using linkages made of graphite, a lightweight, easy to use and precise instrument that retains its precision over time is the result. In addition, graphite works well in the bonding assembly process described in FIG. 19, since graphite linkages are not as well adapted for other fastening processes. For example, graphite is not well suited to be screwed into joint members or similarly fastened with rotary or linear tension.

Figure 21A:
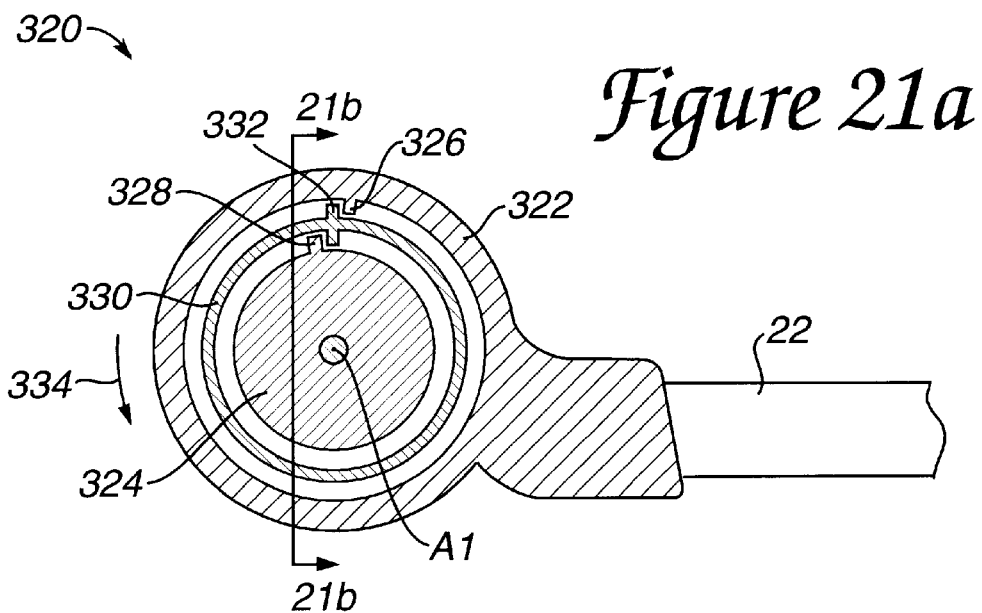
FIGS. 21a and 21b are front and side views of a multi-stage stop joint of the present invention for use with the probe apparatus of FIG. 1.
Figure 21B:
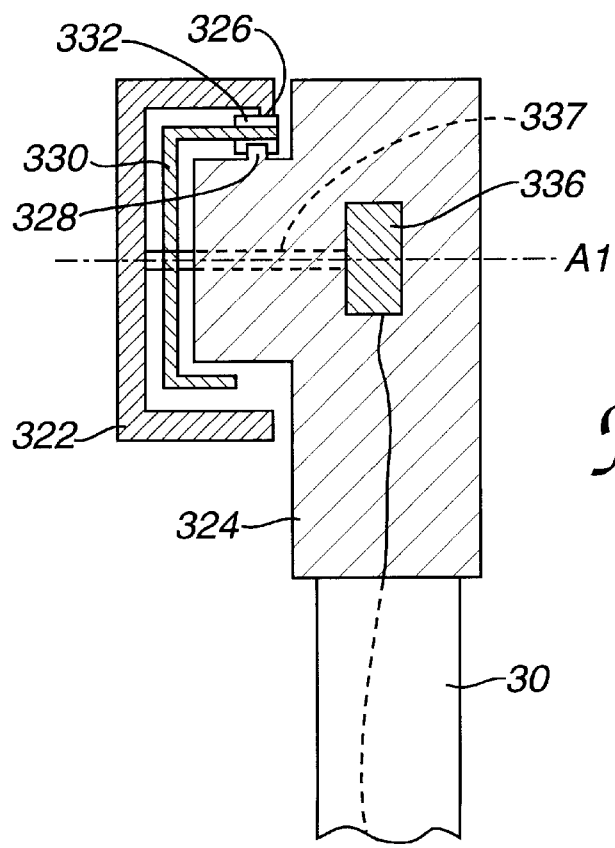

FIG. 21a and 21b illustrate a front view and a side view, respectively, of a multistage stop joint 320 for the present invention. The multistage stop of the present invention allows a linkage or probe of probe apparatus 12, such as stylus 22, to be moved greater than 360 degrees about an axis provided by the multistage stop joint. This allows a greater freedom of movement for the user when tracing object 20 with the probe apparatus.

Joint 320 includes a first member 322 of joint 320 and a second member 324 of joint 320. In the example of FIGS. 21a and 21b, first member 322 is coupled to stylus 22; first member can be coupled to other linkages 30, 32, or 34 of probe apparatus 12 as well. Typically, a user can rotate stylus 22 about an axis A1 by rotating first member 322 about axis A1. Second member 324 typically stays fixed in place on linkage assembly 23. FIG. 21b shows second member 324 coupled to linkage 30. Alternatively, first member 322 can remain fixed while second member 324 is rotated about axis A1. First member 322 includes a first stop 326 and second member includes a second stop 328. In addition, a sensor 336 can be positioned in second member 324 which is coupled to first member 322 via shaft 337.

A middle member 330 is preferably coupled to first member 322. Alternatively, middle member 330 can be coupled to second member 324. Middle member 326 rotates about axis A1 independently of first member 322 and second member 324 and includes a third stop 332.

When first member 322 is rotated about axis A1 in, for example, the counterclockwise direction indicated by arrow 334, first stop 326 eventually impacts third stop 332. If third stop 322 has no obstructions in its path, the middle member 330 is rotated in conjunction first member 322 in the direction of arrow 334. Once third stop impacts second stop 328, however, no further rotation of first member 322 and middle member 330 is allowed, since second member 324 is fixed in place. This configuration of middle member impacting second stop 328 is shown in FIG. 21a.

First member 322 can be rotated in the direction opposite to arrow 334 (clockwise) from the position shown in FIG. 21a. First member 322 is allowed to rotate clockwise almost 360 degrees before impacting third guide 322. Both first member 322 and middle member 330 are then rotated in conjunction in the clockwise direction. Again, the middle member 330 is allowed almost 360 degrees of rotation before impacting second guide 324, which obstructs any further rotation.

Thus, first member 322 is allowed almost 720 degrees of rotation (i.e., two full rotations) in the direction opposite to arrow 334 from the position shown in FIG. 21a until second stop is impacted. The multistage stop joint 320 thus allows a greater range of motion to stylus 22 and any other linkages that are coupled to similar joints. The stylus 22 is still limited in its movement by stops, however, which is important in that a wire bundle that is routed through joint 320 does not become overly stressed or twisted (which would occur if joint 320 had no stops at all).

While this invention has been described in terms of several preferred embodiments, it is contemplated that alterations, modifications and permutations thereof will become apparent to those skilled in the art upon a reading of the specification and study of the drawings. For example, a wide variety of different types of multi-degree-of-freedom sensing apparatuses, besides the disclosed probe apparatus, can be used with several features of the present invention, such as the rotary table, zeroing procedure, selection template, multistage stop joint, and mesh developing procedure. In addition, particular ones of the various features disclosed herein can be selected for use in particular applications alone or in combination with the other inventive features disclosed herein. In addition, the probe apparatus and other methods of the present invention, such as the calibration method, zeroing method, can be used for applications other than digitizing 3-D objects. For example, the probe apparatus 12 can be used to control objects, such as a virtual stylus, in a virtual reality simulation.

Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A method for calibrating a probe apparatus which provides three-dimensional position and orientation data to a computer system, said probe apparatus including a probe coupled to a mechanical linkage assembly including a plurality of joints, said mechanical linkage assembly being supported by a support base, wherein said probe is moveable within a selected volume, and wherein sensors coupled to said mechanical linkage assembly are operative to sense joint angles related to a position and orientation of said probe and provide joint angle data to said computer system, the method comprising:

(a) positioning said probe such that a known point on said probe is located at an arbitrary location within said selected volume with respect to said support base;

(b) varying an orientation of said probe to move a plurality of joints of said mechanical linkage assembly while maintaining said known point on said probe at said arbitrary location;

(c) sampling sets of data at a plurality of orientations of said probe as said orientation of said probe is varied about said arbitrary location, said sets of data being provided by said sensors and describing different configurations of angles of said joints;

(d) determining a set of spatial coordinates for said known point on said probe at each of said plurality of orientations of said probe;

(e) determining a plurality of error, values each error value being between said set of said spatial coordinates determined for each of said plurality of said orientations of said probe and at least one other set of said spatial coordinates; and (f) increasing the accuracy of position and orientation data provided by said probe apparatus by determining calibration parameters based on said error values, said calibration parameters being used when determining said position and orientation of said probe in normal usage.

2. A method as recited in claim 1 further comprising loading previous calibration parameters from a memory device.

3. A method as recited in claim 2 wherein said determining a set of spatial coordinates includes adjusting said previous calibration parameters based on said error values.

4. A method as recited in claim 3 wherein said previous calibration parameters are nominal calibration parameters with assumed ideal values when said probe apparatus is first being calibrated.

5. A method as recited in claim 4 wherein said adjusted calibration parameters are stored such that said adjusted calibration parameters may be later retrieved and used during operation of said probe apparatus.

6. A method as recited in claim 5 wherein said adjusted calibration parameters are stored on an EPROM memory device, said EPROM memory device being unable to store data over previously written data stored in said EPROM memory device.

7. A method as recited in claim 6 wherein said adjusted calibration parameters are stored as a most recent set of adjusted calibration parameters in a specific section of said EPROM memory device such that, when said adjusted calibration parameters are retrieved during operation of said probe apparatus, only said most recent set of adjusted calibration parameters are retrieved.

8. A method as recited in claim 7 wherein said EPROM memory device is positioned within said support base.

9. A method as recited in claim 1 further comprising repeating said positioning said probe, said varying an orientation, said sampling, said determining a set of spatial coordinates, and said determining a plurality of error values, said repeating performed when said probe is placed at a location in said selected volume different from said arbitrary location and using said plurality of sampled orientations from said arbitrary location and said different location when determining said error values.

10. A method as recited in claim 1 wherein said known point on said probe is a tip of said probe.

11. A method as recited in claim 1 therein said determining a set of spatial coordinates includes using kinematic equations in a mathematical representation of said probe, and wherein said error values represent inaccuracies in said mathematical representation.

12. A method as recited in claim 11 wherein said calibration parameters are to be used in calculation with said kinematic equations for said probe when determining said position and orientation of said probe in normal usage.

13. A method for zeroing sensors of a probe apparatus of a three-dimensional coordinate measuring system, said probe apparatus including a linkage arm assembly having a probe positioned at a first end, a support base positioned at a second end, and at least five rotary joints positioned between said probe and said support base, said at least five rotary joints being coupled to a plurality of sensors, each sensor operative to measure an angle differential resulting from movement of an associated rotary joint, the method comprising:

placing said probe in a receptacle positioned on said probe apparatus, said receptacle being positioned such that when said probe is positioned in said receptacle, four of said at least five rotary joints are substantially fixed in a known angular configuration and wherein a fifth of said at least five rotary joints may be positioned at any rotary position relative to a member coupled to said fifth rotary joint, said known angular configuration being a home position;

receiving an indication to zero said sensors of said probe apparatus, wherein said fifth rotary joint is positioned at a particular rotary position relative to said member coupled to said fifth rotary joint when said indication to zero said sensors is received; and assigning a known angle to each of said at least five rotary joints when said probe is positioned in said receptacle, wherein said particular rotary position is considered a known angle for said fifth rotary joint.

14. A method as recited in claim 13 wherein said probe is a stylus.

15. A method as recited in claim 14 wherein said known angles have previously been calibrated for said probe apparatus.

16. A method as recited in claim 13 wherein said indication to zero said sensors includes receiving electrical power for said probe apparatus.

17. A method as recited in claim 13 wherein said receptacle comprises a divot positioned on a joint member rotatable coupled to a grounded joint member of said probe apparatus.

18. A method as recited in claim 13 wherein said fifth of said rotary joints is coupled to said support base and said fifth rotary joint may be positioned to any rotary position relative to said support base.

19. A method as recited in claim 13 wherein a local microprocessor performs said zeroing method such that values associated with said at least five rotary joints in said home position are set.

20. A method as recited in claim 19 wherein said local microprocessor includes setting predefined starting counts associated with said at least five rotary joints in said home position.

21. A method as recited in claim 20 wherein said predefined starting counts are communicated to a quadrature chip.

22. A method as recited in claim 13 wherein said linkage arm assembly includes six rotary joints.

23. A method for calibrating a three-dimensional probe apparatus having a probe moveable within a selected volume and a plurality of joints provided in a mechanical linkage coupled to said probe, the method comprising:
retrieving calibration parameters from a storage device;
sampling a plurality of orientations of said probe as said orientations of said probe are varied at an arbitrary location within said selected volume, wherein a position of a known point on said probe is maintained fixed at said arbitrary location while said orientation of said probe is varied to provide multiple configurations of angles of said joints of said probe apparatus, said sampled plurality of orientations of said probe being sampled from data provided by sensors that detect said joint angles and are coupled to said probe apparatus;
using said sampled plurality of orientations of said probe to determine a set of spatial coordinates of said known point on said probe at each of said sampled plurality of orientations;
comparing said set of determined spatial coordinates of said known point at each of said sampled plurality of orientations and determining differences between said set of determined spatial coordinates at each of said sampled plurality of orientations and at least one other set of said determined spatial coordinates; and
adjusting said calibration parameters based on said determined differences between said set of determined spatial coordinates at each of said sampled plurality of orientations and at least one other set of said determined spatial coordinates such that said adjusted calibration parameters are used when determining a position and orientation of said probe during operation of said probe apparatus.

24. A method as recited in claim 23 wherein said probe apparatus provides three-dimensional position and orientation data to a computer system, wherein said sensors are coupled to said mechanical linkage and are operative to sense said joint angles that are related to said position and orientation of said probe and send joint angle data to said computer system, and wherein said known point on said probe is a tip of said probe.

25. A method as recited in claim 23 wherein said calibration parameters are nominal calibration parameters with assumed ideal values when said probe apparatus is first being calibrated.

26. A method as recited in claim 25 wherein said adjusted calibration parameters are stored such that said adjusted calibration parameters may be later retrieved and used during operation of said probe apparatus.

27. A method as recited in claim 26 wherein said adjusted calibration parameters are stored on an EPROM memory device.

28. A method as recited in claim 23 further comprising repeating said sampling a plurality of orientations of said probe, using said sampled plurality of orientations of said probe to determine a set of spatial coordinates, and comparing said set of determined spatial coordinates, said repeating performed when the probe is placed at a location in said selected volume different from said arbitrary location and using said plurality of sampled orientations from said arbitrary location and said different location when determining said determined differences between said set of determined spatial coordinates at each of said sampled plurality of orientations and at least one other set of said determined spatial coordinates.

29. A method for zeroing sensors of a probe apparatus of a three dimensional coordinate measuring system, said probe apparatus including a linkage arm assembly having a probe positioned at a first end, a support base positioned at a second end, and N rotary joints positioned between said probe and said support base, wherein N is an integer, said N rotary joints being coupled to a plurality of sensors, each sensor operative to measure an angle differential resulting from movement of an associated rotary joint, the method comprising:
placing said probe in a receptacle positioned on said probe apparatus, said receptacle being positioned such that when said probe is within said receptacle, N–1 of said rotary joints are substantially fixed in a known angular configuration, and an Nth rotary joint is substantially free to be positioned at any rotary position relative to a member coupled to said Nth rotary joint; and
providing a known angle reference for said sensors when said N–1 rotary joints are in said known angular configuration when an indication to zero said sensors is received, wherein a particular rotary position of said Nth rotary joint relative to said member is considered a known angle for said Nth rotary joint, said Nth rotary joint being positioned at said particular rotary position when said indication to zero said sensors is received.

30. A method as recited in claim 29 wherein said member coupled to said Nth rotary joint is said support base, wherein said Nth rotary joint is substantially free to be positioned at any rotary position relative to said support base.

31. A method for zeroing sensors of a probe apparatus of a three dimensional coordinate measuring system, said probe apparatus including a linkage arm assembly having a probe positioned at a first end, a support base positioned at a second end, and a plurality of rotary joints positioned between said probe and said support base, said rotary joints being coupled to a plurality of relative sensors, each of said sensors operative to measure an angle differential resulting from movement of an associated rotary joint, the method comprising:
providing an index mark at a predetermined position in a sensing range of each of said relative sensors such that each of said index marks corresponds to a known angle of an associated rotary joint;
detecting said index mark for each of said sensors when a user grasps said probe and moves said probe within a workspace, said movement of said probe causing said rotary joints to rotate such that said index mark of each of said sensors is detected; and
assigning a predefined reference angle to each of said rotary joints associated with said detected index mark of each of said sensors, wherein said predefined reference angle of each of said rotary joints associated with said detected index mark of each of said sensors is a reference zero angle.

32. A method as recited in claim 31 wherein said probe is moved by said user from a first location in said workspace to a second location in said workspace, said movement causing said index mark of each of said sensors to be sensed by said associated sensor.

33. A method as recited in claim 32 wherein said first and second locations in said workspace are predetermined.

34. A method as recited in claim 31 wherein said movement of said probe in said workspace is a single, fluid motion to cause said index mark of each of said sensors to be detected.

35. A probe apparatus which provides three-dimensional position and orientation data to a computer system and determines calibration parameters, said probe apparatus comprising:
   a mechanical linkage assembly, including:
      a support base provided at a first end of said mechanical linkage assembly for supporting said mechanical linkage assembly;
      a probe provided at a second end of said mechanical linkage assembly and moveable within a selected volume;
      a plurality of joints provided between said probe and said support base; and
      a plurality of sensors coupled to said mechanical linkage assembly operative to sense joint angles related to a position and orientation of said probe and provide joint angle data to said computer system;
   means for determining a set of spatial coordinates for a known point on said probe at each of a plurality of sampled orientations of said probe when said probe is positioned at an arbitrary location within said selected volume and said orientation of said probe is varied while maintaining said known point on said probe at said arbitrary location;
   means for determining error values, each of said error values being between said set of spatial coordinates determined for each of said plurality of said sampled orientations and at least one other set of said spatial coordinates; and
   means for increasing the accuracy of position and orientation data provided by said probe apparatus by determining calibration parameters based on said error values, said calibration parameters being used when determining said position and orientation of said probe in normal usage.

36. A probe apparatus which provides three-dimensional position and orientation data to a computer system and zeroes transducers of the apparatus, the probe apparatus comprising:
   a mechanical linkage assembly, including:
      a support base provided at a first end of said mechanical linkage assembly for supporting said mechanical linkage assembly;
      a probe provided at a second end of said mechanical linkage assembly and moveable within a selected volume;
      N rotary joints positioned between said probe and said support base, wherein N is an integer; and
      a plurality of sensors coupled to said mechanical linkage assembly, each sensor operative to measure an angle differential resulting from movement of an associated rotary joint;
   a receptacle positioned on a joint member rotatably coupled to said support base of said probe apparatus such that when said probe is positioned in said receptacle, N−1 of said rotary joints are substantially fixed in a known angular configuration, and an Nth rotary joint is substantially free to be positioned at any angular position; and
   a device that provides a known zero angle reference for said sensors when said N−1 rotary joints are in said known angular configuration.

37. A method for zeroing sensors of a probe apparatus of a three-dimensional coordinate measuring system, said probe apparatus including a linkage arm assembly having a probe positioned at a first end, a support base positioned at a second end, and at least five joints positioned between said probe and said support base, said at least five joints being coupled to a plurality of sensors, each sensor operative to measure an angle differential resulting from movement of an associated joint, the method comprising:
   placing said probe in a receptacle positioned on said probe apparatus, said receptacle being positioned on a joint member rotatably coupled to a grounded joint member of said probe apparatus such that when said probe is positioned in said receptacle, four of said at least five joints are substantially fixed in a known angular configuration and wherein a fifth of said at least five joints may be positioned at any angular configuration, said known angular configuration being a home position;
   receiving an indication to zero said sensors of said probe apparatus; and
   assigning a known angle to each of said at least five joints when said probe is positioned in said receptacle.

38. A method as recited in claim 37 wherein said receptacle comprises a divot positioned on said joint member rotatably coupled to said grounded joint member.

* * * * *